United States Patent
Pieniazek et al.

(10) Patent No.: US 11,263,218 B2
(45) Date of Patent: Mar. 1, 2022

(54) GLOBAL MATCHING SYSTEM

(71) Applicant: Equifax Inc., Atlanta, GA (US)

(72) Inventors: Lester Anthony Pieniazek, Alpharetta, GA (US); Stephen Leitner, Alpharetta, GA (US); Steven Hicklin, Yorkshire (GB)

(73) Assignee: EQUIFAX INC., Atlanta, GA (US)

( * ) Notice: Subject to any disclaimer, the term of this patent is extended or adjusted under 35 U.S.C. 154(b) by 312 days.

(21) Appl. No.: 16/096,204

(22) PCT Filed: Apr. 26, 2017

(86) PCT No.: PCT/US2017/029558
§ 371 (c)(1),
(2) Date: Oct. 24, 2018

(87) PCT Pub. No.: WO2017/189674
PCT Pub. Date: Nov. 2, 2017

(65) Prior Publication Data
US 2019/0138525 A1    May 9, 2019

Related U.S. Application Data

(60) Provisional application No. 62/327,705, filed on Apr. 26, 2016.

(51) Int. Cl.
*G06F 16/2457* (2019.01)
*G06F 16/2455* (2019.01)
(Continued)

(52) U.S. Cl.
CPC ...... *G06F 16/24575* (2019.01); *G06F 16/245* (2019.01); *G06F 16/248* (2019.01); *G06F 16/24558* (2019.01)

(58) Field of Classification Search
CPC ......... G06F 16/24575; G06F 16/24558; G06F 16/248
See application file for complete search history.

(56) References Cited

U.S. PATENT DOCUMENTS 8,515,987 B1 * 8/2013 Jain .................. G06F 16/215
                                                          707/769
9,208,179 B1   12/2015 Song et al.
(Continued)

FOREIGN PATENT DOCUMENTS

WO    2014066816    5/2014
WO    2017189674    11/2017

OTHER PUBLICATIONS

PCT/US2017/029558, "International Search Report and Written Opinion", dated Jul. 26, 2017, 11 pages.

*Primary Examiner* — Miranda Le
(74) *Attorney, Agent, or Firm* — Kilpatrick Townsend & Stockton LLP

(57) ABSTRACT

A global matching system can include a processing device and a memory device on which instructions can be stored. The processing device can execute the instructions to receive input data to be matched to target data stored in the memory device. The processing device can identify at least one context parameter for the input data. The context parameter indicate a location-specific characteristic or culturally specific characteristic of an entity associated with the input data. The processing device can access program code for matching tools and select a subset of the matching tools' program code based on the identified context parameter. The processing device can identify, based on the identified context parameter, an order of execution for the selected program code. The processing device can execute the (Continued)

selected program code in the identified order of execution and output a matching result for the input data and the target data.

16 Claims, 21 Drawing Sheets

(51) Int. Cl.
*G06F 16/248* (2019.01)
*G06F 16/245* (2019.01)

(56) References Cited

U.S. PATENT DOCUMENTS

| | | | |
|---|---|---|---|
| 9,218,372 B2* | 12/2015 | Shami | G06F 16/215 |
| 9,292,581 B2* | 3/2016 | Thompson | G06F 16/90344 |
| 9,588,960 B2* | 3/2017 | Nekhay | G06F 40/295 |
| 2004/0220918 A1* | 11/2004 | Scriffignano | G06F 16/245 |
| 2005/0273468 A1* | 12/2005 | Hermansen | G06F 16/90344 |
| 2006/0195488 A1* | 8/2006 | Cesare | G06F 16/215 |
| 2011/0030057 A1* | 2/2011 | Chen | H04L 69/22 |
| | | | 726/23 |
| 2011/0047175 A1 | 2/2011 | Cheng et al. | |
| 2012/0117116 A1 | 5/2012 | Jacobson et al. | |
| 2013/0159346 A1 | 6/2013 | Kasravi et al. | |
| 2014/0067803 A1* | 3/2014 | Kapadia | G06F 16/215 |
| | | | 707/736 |
| 2015/0161214 A1* | 6/2015 | Kali | G06F 16/24558 |
| | | | 707/758 |

\* cited by examiner

| | | |
|---|---|---|
| GESTALT | ○ MAP/SCHEMA GIVES OVERALL STRUCTURE | |
| | ○ PLAN DEFINES WHAT TO DO | |
| | ○ CONTEXT CAPTURES RELEVANT STATE OF PLAN EXECUTION | ○ PLUG-IN OPPORTUNITY<br>○ CONFIGURED WITH POSSIBLE STATE<br>○ LOOSE COUPLING TO CONTEXT |
| COHORTS | ○ GRUNTS PERFORM SPECIFIC DETAIL ACTION | |
| | ○ SCOUT FOLLOWS PLAN AND DEPLOYS APPROPRIATE GRUNTS | |
| | ○ XSERVER HOUSES AND PROVIDES ACCESS TO GRUNTS VIA IDS | |
| | ○ TOOLS: SPECIFIC ALGORITHMS USED BY GRUNTS | |
| LOGISTICS | ○ BUILDERS CREATE AND CONFIGURE APPROPRIATE COHORT | ○ GRUNTS/SCOUTS GENERALLY CONFIGURE THEMSELVES BASED ON PLAN DIRECTIVES |
| | ○ FACTORIES CREATE UNCONFIGURED GRUNTS AND SCOUTS | ○ PLUG-IN MECHANISM |
| MANAGEMENT | ○ JOB INITIATES, INTERATES, WRAPS UP | ○ GENERALLY THREAD SAFE |
| | ○ APPLICATION SERVER HANDLES REQUESTS AND MANAGES JOB LIFE CYCLE | ○ REQUEST PACKET INTERFACE |

FIG. 15

| PART | FUNCTION | SUBPART | FUNCTION | USES | EXTEND |
|---|---|---|---|---|---|
| BUNDLE FORMAT | READABLE NAMES FOR FIELDS AND BIT MASKS | PHRASE | TAGS FOR INPUT OR DERIVED TEXT | | |
| | | CLUSTER | TAGS FOR DERIVED TOKEN KEYS OR HASHES | | |
| | | TALLY | TAGS FOR METRICS AND INFERENCE FLAGS | | |
| | | MASK | TAGS FOR FLAGS | MASK | |
| | | MTEST | COMMON BOOLEAN TESTS ON FLAGS | MASK | |
| APP RULES | MAJOR FACTORIES FOR RULES AND BUILDERS | BUNDLE BUILDER | ADAPTOR BETWEEN CLIENT AND BUNDLE DATA REPRESENTATIONS | DEPENDS ON IMP. USUALLY BUNDLE FORMAT | DERIVE CLASS |
| | | MRULE FACTORY | PRODUCE OBJECT TO MANAGE COMPARISON STEPS IN A MATCH | DEPENDS ON IMP. USUALLY CORE. SEE SAMPLE IMP | ADAPTOR + PACKAGE |
| | | MATCH SCORER FACTORY | PRODUCE OBJECT TO SCORE AND RANK MATCHES IN A QUERY | DEPENDS ON IMP. USUALLY CORE. SEE SAMPLE IMP | ADAPTOR + PACKAGE |

FIG. 16

| PART | FUNCTION | CONFIGURE | USES | EXTEND |
|---|---|---|---|---|
| SPECTRUM INSTANCE | MAP A METRIC VALUE TO AN INFERENCE | CORE LOADER | MASKS | |
| CONTRASTOR INSTANCE | COMPARE FACETS OF QUERY TO CANDIDATE | KEY VALUE PAIRS | SPECTRUM | PLUGIN FACTORY MAY REQUIRE A START UP INITILIZATION (EG, GENDER TABLES) |
| TRANSFORM INSTANCE | GENERATE NEW FACETS OF A BUNDLE | KEY VALUE PAIRS | | PLUGIN FACTORY MAY REQUIRE A START UP INITILIZATION (EG, ADDRESS STANDARDIZER) |
| PROBE INSTANCE | APPLY WIDGET INSTANCES TO SPECIFIC FACETS | KEY VALUE PAIRS | CONTRASTOR, TRANSFORM, BUNDLE FORMAT, MTest | |
| | | | | |
| | | | | |

FIG. 17

| PART | FUNCTION | SUBPART | FUNCTION | USES | EXTEND |
|---|---|---|---|---|---|
| MRule | STATE MACHINE TO MANAGE COMPARISON STEPS IN A MATCH | NODE | A SPECIFIC SCAN ITERATION NODES | PROBES, BUNDLE FORMAT | |
| | | NodeRules | START, STOP NODES | NODE | |
| | | TRANSITION | TRANSITION RULES BETWEEN SCAN STATES | NODE, BUNDLE FORMAT, MTest | |
| ScoreRules | DEFINE SCORING RULES | | | BUNDLE FORMAT, MTest | |
| | | | | | |
| | | | | | |

FIG. 18

| IMPLEMENTATION RULES SUBSET |
|---|
| BEGIN<br>COMPARE INPUT NAME AND ADDRESS AS SAME OR BLANK<br>HALT WHEN NameSame & AddressSame<br>NameClean WHEN AddressSame<br>SameTown OTHERWISE |
| SAME TOWN<br>PARSE INPUT ADDRESS INTO STREET TOWN STATE ZIP FIELDS. CHECK COMPATIBILITY (SAME OR BLANK) WITH QUERY VALUES.<br>HALT WHEN (NOT COMPATIBLE ZIP-STATE TOWN) OR (pStreetSame & pNameSame)<br>StreetClean WHEN pNameOk<br>NameClean OTHERWISE |
| NameClean<br>TAKE INPUT NAME, REMOVE SPURIOUS CHARACTERS AND WORDS. SAVE AS cleanName. COMPARE SIMILARITY TO QUERY. CleanName WITH AND WITHOUT SPACES<br>HALT WHEN StreetSame & NameSame<br>StreetClean WHEN NameOk<br>NameCleanToken OTHERWISE |
| NameCleanToken<br>TAKE cleanName, TOKENIZE WORDS AND STORE cleanNameTokens. COMPARE SIMILARITY WITH QUERY cleanNameTokens<br>HALT WHEN NameBad OR (NameLike & StreetSame) OR NameSomeLike & StreetSame )<br>StreetClean WHEN NameSomeLike<br>NameNorm OTHERWISE |

FIG. 20

| TYPES | PRIMARY COMPONENT | WHAT | USES |
|---|---|---|---|
| MESSAGES AND WARNINGS | BUILDERS | UNKNOWN TAG MISSING PARAMETER SYNTAX ERROR | DETECT AND CORRECT CONFIGURATION ERRORS OR FAULTS |
| OBJECT PRINTS | CONTEXT OBJECTS | DISPLAY BUILD OBJECTS | VALIDATE CONFIGURATION LOGIC PROCESSED AS INTENDED |
| MATCH LOGS | CANDIDATE MATCH CARD | PROGRESS THRU MATCH RULES | OVERVIEW RATIONALE FOR MATCH TUNE MATCH RULES |
| COMPARISON SCORES | CANDIDATE BUNDLE | VALUES OF FACETS WIDGET SCORES AND INFERENCES | IN DEPTH RATIONALE FOR MATCH TUNE WIDGETS |
| DETAILS TRACES | WIDGETS | CALCULATION OF DETAILS DEPEND ON WIDGETS | DETAIL FRAMEWORK DEBUG |

FIG. 21

GLOBAL MATCHING SYSTEM

CROSS REFERENCE TO RELATED APPLICATIONS

This disclosure is related to and claims the benefit of priority of U.S. Provisional Application No. 62/327,705, titled "Global Matching System" and filed on Apr. 26, 2016, which is hereby incorporated by this reference in its entirety.

TECHNICAL FIELD

The present disclosure relates to database query processing and more particularly (although not necessarily exclusively), to a global matching system.

BACKGROUND

Search engines, analytical systems, and other online services are used to match input data with target data (e.g., documents and identities) from a wide range of digital data sources. Search engines search digital data sources (e.g., databases) via a network (e.g., the Internet) for keywords present in the input data to establish relationships between the input data and target data. The search engine can determine input data and target data match based on the relationship and use the identified relationship to more quickly identify matches for similar inputs. As networked computing devices gain access to larger amounts of digital data, search engines depend on established relationships and rely more heavily on matching keywords from the input data and the target data to reduce the processing requirements. But, differences in the format or the completeness of the input data and the target data can prevent search engines from establishing a relationship between the input data and the target data. In some examples, the volume and diversity of digital data accessible by a search engine may prevent a search engine from recognizing that the input data is incomplete. Failure by a search engine to account for these variations can lead to inaccurate search results or inefficient use of processing resources.

SUMMARY

Aspects and examples are disclosed for a global matching system that can match individuals or other entities using matching tools that are suitable for one or more contexts associated with the individuals or entities. In some aspects, a global matching system, which can include a processing device and a memory device storing executable instructions, can receive input data to be matched to target data. The processing device can identify at least one context parameter for the input data. The context parameter indicate a location-specific characteristic or culturally specific characteristic of an entity associated with the input data. The processing device can access program code for matching tools and select a subset of the matching tools' program code based on the identified context parameter. The processing device can identify, based on the identified context parameter, an order of execution for the selected program code. The processing device can execute the selected program code in the identified order of execution and output a matching result for the input data and the target data.

This illustrative example is mentioned not to limit or define the invention, but to aid understanding thereof. Other aspects, advantages, and features of the present invention will become apparent after review of the entire description and figures.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

FIG. 15 depicts an example of different layers of operation performed by a global matching system to coordinate matching operations according to one aspect of the present disclosure.

FIG. 16 depicts an example of global matching system features that can be used to implement certain performance goals for a matching system according to one aspect of the present disclosure.

FIG. 17 depicts another example of a global matching system executing a matching operation according to one aspect of the present disclosure.

FIG. 18 depicts examples of rules and other configuration information that can be used by a global matching system according to one aspect of the present disclosure.

FIG. 20 depicts an example of a set of implementation rules for an implementation example of the global matching system according to one aspect of the present disclosure.

FIG. 21 depicts an example of tools for an implementation example of the global matching system according to one aspect of the present disclosure.

DETAILED DESCRIPTION

Figure 1:
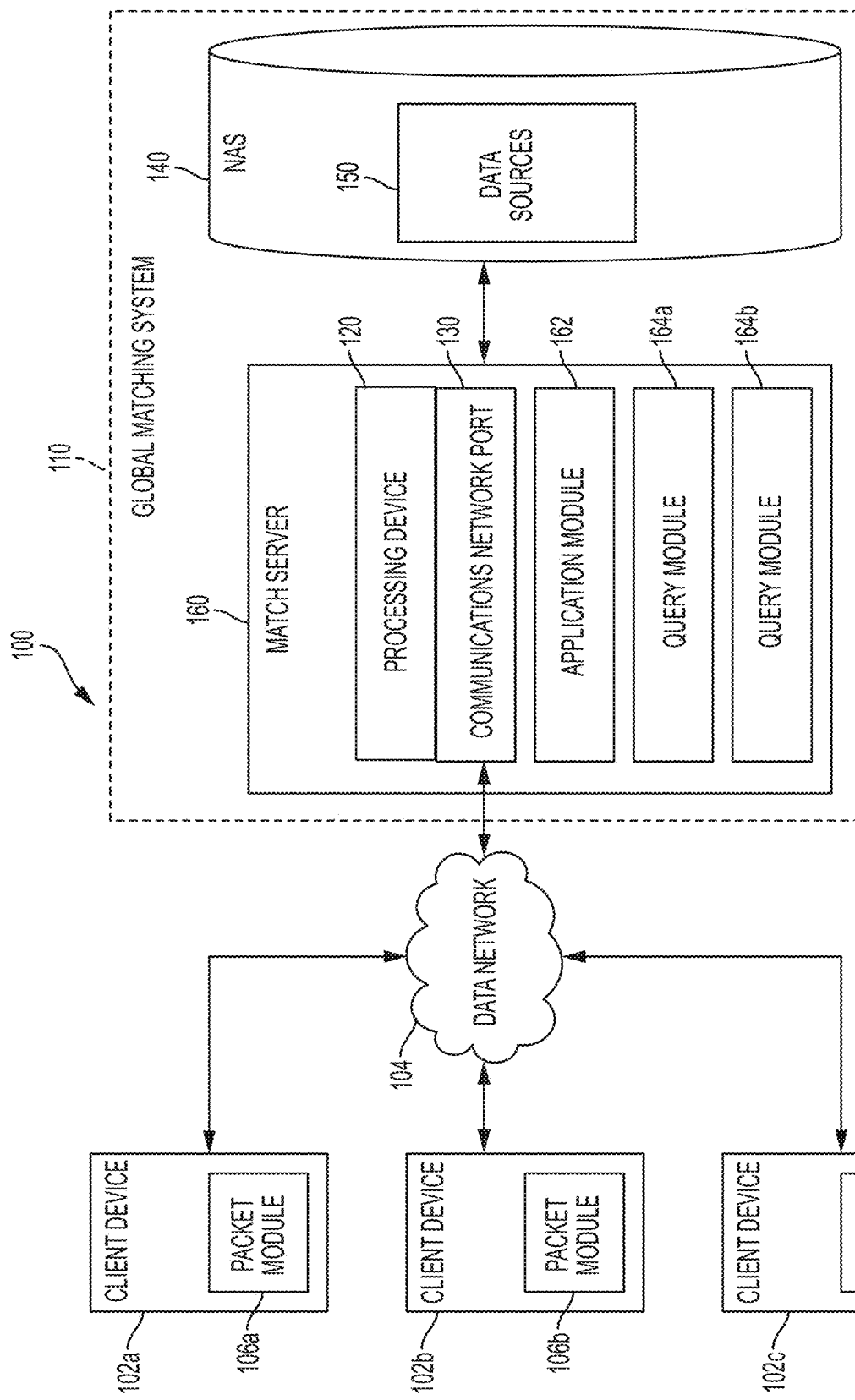
FIG. 1 depicts an example of a computing environment for a global matching system according to one aspect of the present disclosure.

Certain aspects and features relate to a global matching system that can match individuals or other entities using matching tools that are suitable for one or more contexts associated with the individuals or entities. A global matching system can include a system that is customizable for multiple different geographic contexts, cultural contexts, and other contexts. In some aspects, a global matching system can use matching tools or schemes that are based on geographically specific attributes of individuals or other entities, culturally specific attributes of individuals or other entities, etc. For example, a global matching system can receive a request to find a match for a set of input data. The global matching system can identify at least one context parameter for the input data. The global matching system can select a group of matching tools and an order for executing the matching tools based on the context parameters. The global matching system can execute the selected matching tools in the selected order to efficiently and accurately match the input data with one or more target data, which can include identifiers of entities and data describing transactions in which the entities have engaged.

The global matching system can include one or more software engines that employ pluggable matching tools or other suitable components to realize an adaptive search strategy. In some aspects, a global matching system can provide a flexible, configurable framework for constructing matching applications rather than providing specific components for operations. For example, a global matching system can provide or otherwise use, a suite of components to parse, tokenize, and compare input data (e.g., one or more sets of information describing a person) to target data (e.g., data sets such as credit records, sales records, or any other data stores that can be used to identify certain entities). These components can be software modules that can be plugged into the global matching system. In some aspects, matching techniques that have not been previously encountered by the matching system can be added as plug-ins that conform to the component architecture of the global matching system.

In some aspects, a global matching system can provide improved performance for a matching operation. For example, a global matching system can ignore actions that would provide little or no insight as to a relationship between input data and target data, and can employ plug-ins suited to a particular context (e.g., based on a geographic location of an entity associated with the input data. In additional or alternative aspects, a global matching system can provide improved accuracy for a matching operation. For example, a global matching system can select actions that give better separation between different input data depending on the context and can utilize components with better resolution.

In some aspects, a matching tool can perform tight matching. In additional or alternative aspects, a matching tool can perform loose matching. The global matching system can also perform different types of matching and compare the results from different matches. In some examples, the global matching system can apply a tiered approach to match input data to target data. In additional or alternative aspects, the global matching system can use pluggable components that include different algorithms and rules. The global matching system can be extendable or expandable to utilize new matching tools, improved matching tools, alternative matching tools, etc., rather than being limited to a rigid matching process. In additional or alternative aspects, the global matching system can identify one or more relevant context parameters for the input data. Examples of context parameters include, but are not limited to, whether the input data refers to a person or a business, whether the input data involves commercial data or personal data, etc. The global matching system can select certain matching tools based on the context parameters identified for the input data.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The Global Matching System

Referring now to the drawings, FIG. 1 depicts an example of a computing environment 100 that can be used for global matching. The computing environment 100 can be a specialized computing environment that may be used for processing large amounts of data using a large number of computer processing cycles. The computing environment 100 may include client devices 102a-c (e.g., a computing device) and a global matching system 110. The computing environment 100 can also include a data network 104 for communicatively coupling the client devices 102a-c with the global matching system 110.

One or more network-attached data stores ("NAS") 140 can include memory devices for storing data sources 150 provided to the global matching system 110 by one or more components of the computing environment 100. The data sources can include identifiable information about an entity (e.g., an individual or a business). In some aspects, the data sources 150 can include credit data, education data, employment data, and asset data. In additional or alternative aspects, the data sources 150 can include text data (e.g., social security number, a phone number, or an address), biometrics data (e.g., face or a voice composite), digital identity data (e.g., a media access control address of the client device 102a associated with the entity), or a combination thereof.

The NAS 140 may also store a variety of different types of data organized in a variety of different ways and from a variety of different sources. For example, NAS 140 may include storage other than primary storage located within global matching system 110 that is directly accessible by processors located therein. NAS 140 may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored. Examples of a non-transitory medium may include, for example, a magnetic disk or tape, optical storage media such as compact disk or digital versatile disk, flash memory, or memory devices.

The global matching system 110 may be a specialized computer or other machine that processes the data received within the computing environment 100. The global matching system 110 can include a matching server 160 and a NAS 140. The match server 160 can include one or more processing devices 120, a communications network port, and one or more modules 162, 164a-b. The one or more processing device 120 can execute program code, which includes an executive engine and is stored on a non-transitory computer-readable medium. In some aspects, the global matching system 110 can receive a request to match input data with information stored in the data sources 150. The query modules 164a-b can perform different queries of different databases to identify target data. The target data can include identifiers of entities and data describing transaction in which the entities have engaged. The application module 162 can execute matching tools to transform the input data and compare the input data to the target data.

The global matching system 110 may include one or more other systems. For example, the global matching system 110 may include a database system for accessing the NAS 140, a communications grid, or both. A communications grid may be a grid-based global matching system for processing large amounts of data.

The client devices 102a-c can be associated with an entity or an online service and can communicate with the global matching system 110. For example, the client device 102a may be a mobile phone associated with an entity that can transmit data sources 150 to the global matching system 110 to be processed. The client devices 102a-c can include packet modules 106a-c for communicating packets with the match server 160. The client devices 102a-c can maintain a context reference (e.g., an object pointer or an index) to the match server 160 and the match server 160 can interface with the client devices 102a-c such that details are hidden. In one example, the client device 102a may transmit a packet including input data to the global matching system 110 to match the input data. The client devices 102a-c may interact with the global matching system 110 via the data network 104 (e.g., a telecommunications network).

In some aspects, the client devices 102a-c may include network computers, sensors, databases, or other devices that may transmit or otherwise provide data to global matching system 110. For example, the client devices 102a-c may include local area network devices, such as routers, hubs, switches, or other computer networking devices.

Each communication within the computing environment 100 (e.g., between client devices or between a server and a device) may occur over one or more data networks 104. Data networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 104. The data networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

The numbers of devices depicted in FIG. 1 are provided for illustrative purposes. Different numbers of devices may be used. For example, while each device, server, and system in FIG. 1 is shown as a single device, multiple devices may instead be used.

Figure 2:
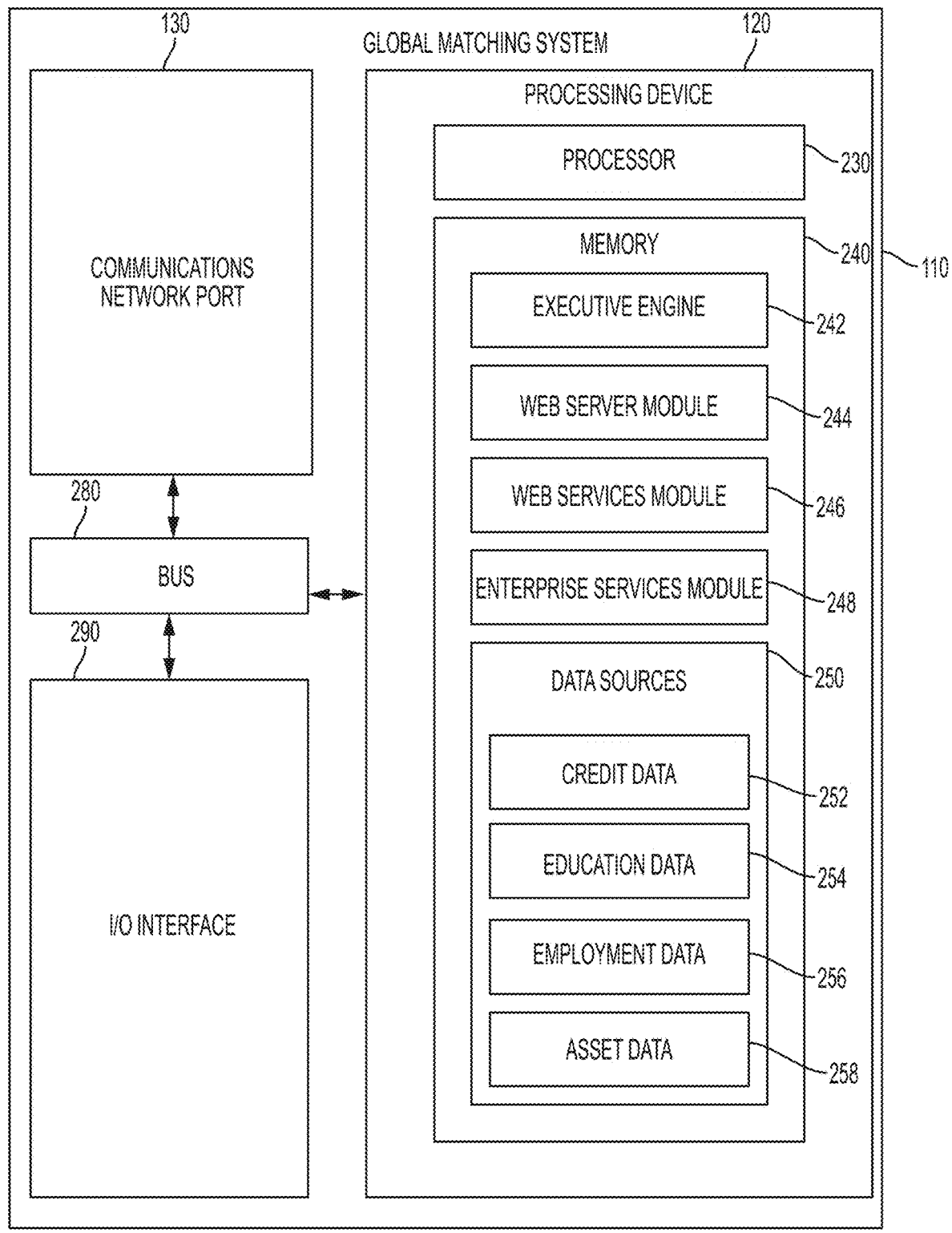
FIG. 2 depicts an example of a global matching system of FIG. 1 according to one aspect of the present disclosure.

One or more suitable computing systems can be used to implement the global matching system 110. FIG. 2 depicts an example of the global matching system 110 depicted in FIG. 1. Although FIG. 2 depicts a single computing system for illustrative purposes, any number of servers or other computing devices can be included in a computing system. For example, a computing system may include multiple computing devices configured in a grid, cloud, or other distributed computing system.

The global matching system 110 can include a processing device 120, a communications network port 130, an input/output ("I/O") interface 290, and a bus 280.

The processing device 120 can include a processor 230 that is communicatively coupled to a memory 240. The processor 230 can execute computer-executable program code stored in the memory 240, access information stored in the memory 240, or both. Program code may include machine-executable instructions that may represent a procedure, a function, a subprogram, a program, a routine, a subroutine, a module, a software package, a class, or a combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, and network transmission, among others.

Examples of the processor 230 can include a microprocessor, an application-specific integrated circuits, a field-programmable gate array, or any other suitable processing device. The processor 230 can include any of a number of processing devices, including one. The processor 230 can include or may be in communication with the memory 240 that stores program code that, when executed by the processor 702, causes the processor to perform the operations described in this disclosure.

The memory 240 can include any suitable non-transitory computer-readable medium. The non-transitory computer-readable medium can include any electronic, optical, magnetic, or other storage device capable of providing a processor with computer-readable program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The global matching system 110 can execute program code that includes the executive engine 242. The program code for the executive engine 242 may be resident in any suitable computer-readable medium and may be executed on any suitable processing device. For example, as depicted in FIG. 2, the program code for the executive engine 242 can reside in the memory 240 in the global matching system 110. Executing the executive engine 242 can configure the processor 230 to perform the operations described herein.

Program code stored in the memory 240 can include the executive engine 242 described above as well as one or more of a web server module 244, a web services module 246, and an enterprise services module 248. For example, the web server module 244 can be executed by a suitable processing device to provide one or more web pages or other interfaces to a client system. The web pages or other interfaces can include content provided by the web services module 246. The web services module 246 can generate this content by executing one or more matching operations using information retrieved from one or more of the data sources 250. The enterprise services module 248 can be executed to retrieve the information from one or more of the data sources 250 and execute one or more algorithms or program code portions for generating risk assessments using the retrieved information. For illustrative purposes, FIG. 2 depicts the web server module 244, the web services module 246, and the enterprise services module 248 as different modules. However, other implementations are possible. For example, a common application or module can perform one or more functions of the web server module 244, the web services module 246, and the enterprise services module 248.

The data sources 250 can include target data that is matched to input data received by the global matching system 110. In some examples, the data sources 250 includes secure and credentialed databases managed by or otherwise accessible by the global matching system 110. In additional or alternative examples, the data sources 250 include internal databases or other data sources that are stored at or otherwise accessible to the global matching system 110. The data sources 250 can also include external databases that are accessible to the global matching system 110 system via external networks. Non-limiting examples of data stored in the data sources 250 include credit data 252, education data 254, employment data 256, and asset data 258 (e.g., property records or data regarding other assets possessed by a client). Additional or alternative examples include income data, tax data, data from service providers (e.g., cable television companies, telecommunications operators, and utility providers), and other types of information about individuals or other entities.

In some aspects, the data sources 250 (which may include internal or external databases) may be data storage devices controlled by the owner or operator of the global matching system 110. The data sources 250 can include client-related information from trusted sources. The data sources 250 can be updated periodically or continuously. In other aspects, the internal or external databases are controlled by an entity other than the owner of the global matching system 110.

The global matching system 110 can include, or be communicatively coupled with, a number of external or internal devices. The communications network port 130 can include any device or group of devices suitable for establishing a wired or wireless data connection to one or more data networks. Non-limiting examples of the network interface include one or more of an Ethernet network adapter, an RF transceiver, a modem, an optical emitter, an optical transceiver, etc. The I/O interface 290 can receive input from input devices or provide output to output devices. The bus 280 can communicatively couple one or more components of the global matching system 110.

The global matching system 110 can be used to address situations in which no "perfect" match exists. For example, the "best" matching capability for a given business problem may depend on factors such as business domain (e.g., consumer, commercial, marketing, auto, or insurance), geography and demographics (e.g., different address structures or different name structures), data quality and prep (e.g., cleansed structured data will need different techniques to messy or unstructured data), topic (e.g., address matching or name matching), quality (e.g., "Credit Quality" matching will have different cut-offs to a match for fraud purposes), performance (e.g., systems may need to implement high speed algorithms that sacrifice hit rate), and returns (e.g., some systems need a single best match returned and others require a set of possible candidates).

The global matching system 110 can include or otherwise act as a universal framework that can utilize multiple matching tools in an integrated manner. For example, the global matching system 110 can use matching tools or other components that are common to different types of matching problems. The common parts are factored out, and the global matching system 110 includes a framework that can prepare data for use with different matching tools using the factored out common parts. The matching tools can include program code portions for matching different types of input data to target data.

The global matching system 110 can access different software matching modules whose operations can be combined (e.g., performed in a specified sequences) based on certain configuration data. In some aspects, the global match system 110 can be used to build a standard set of links into a matching framework once and to insert one or many modules into the framework. The modules can be pre-existing modules targeted at specific business problems, new modules for a new problem, or both.

The global matching system 110 can be used to build a library of components over time, which can allow for more re-use on a global scale. For example, a name matching system developed for Canada can be re-used in the United States or the United Kingdom, as well as allowing for standardized regressions and monitoring capabilities to be developed, allowing for significantly reduced testing work, reducing project cost and time.

In some aspects, the software matching modules accessed by the global matching system 110 can be stackable. For example, a hierarchical company name module developed by, for example, a Peruvian division of a company can be combined with a semantic name company name matching module created by the company. The combination of these modules can be modified to provide a combined "United Kingdom" matching capability.

In some aspects, the global matching system 110 can be used to customize matching processes based on a country or other jurisdiction in which the global matching system 110 is used. For example, different countries or jurisdiction may impose may require increased accuracy of matching entities based on a minimal amount of information. The global matching system 110 can include a monitoring module and an auditing module that can be tailored for any geography or regulatory regime.

The global matching system 110 can use an extendable match framework. This framework can perform match processing of a query or set of queries against a candidate set list generated by a search tool. In some aspects, the framework can include portability to different commodity computing environments and compatibility with common programming language sets. In additional or alternative aspects, the framework can include an ability to run standalone as a service or embedded in other technology and an ability to run in an offline or an online environment. In additional or alternative aspects, the framework can include an ability to externalize pluggable transform algorithms (e.g., parsers, cleansers, normalizers, etc.) and an ability to externalize pluggable contrast/comparator algorithms (e.g., string compares, token compares, cluster compares). In additional or alternative aspects, the framework can include an ability to externalize a rules engine (e.g., by using a third-party rules engine) and an ability to externalize the score card processing. In some examples, the framework can allow for 0-n results returned from the candidate set list, an ability to track and record events, and support for disassociation if supplied in candidate or query data, etc.

Different types of matching tools may be used with the global matching system 110 and different matching tools can include different program code portions for matching different types of input data to target data. In one example, a semantic matching process can be used to match input data to target data. Semantic matching can involve the global matching system 110 (or a tool used by the global matching system 110) identifying or accessing certain characteristics about a user or entity and using those characteristics in a matching process. For example, the global matching system 110 may determine that an individual described in input data is a male, and may look for male names in the target data when performing a matching process. In another example, a least-worst matching process can be used to match input data to target data by finding target data that is the closest rather than finding target data that fully matches. In another example, systematic matching can be used to determine which target data is most like the input data by analyzing different portion of the input data and narrowing the possible target data based on a comparison to each portion individually.

The Executive Engine

Figure 3:
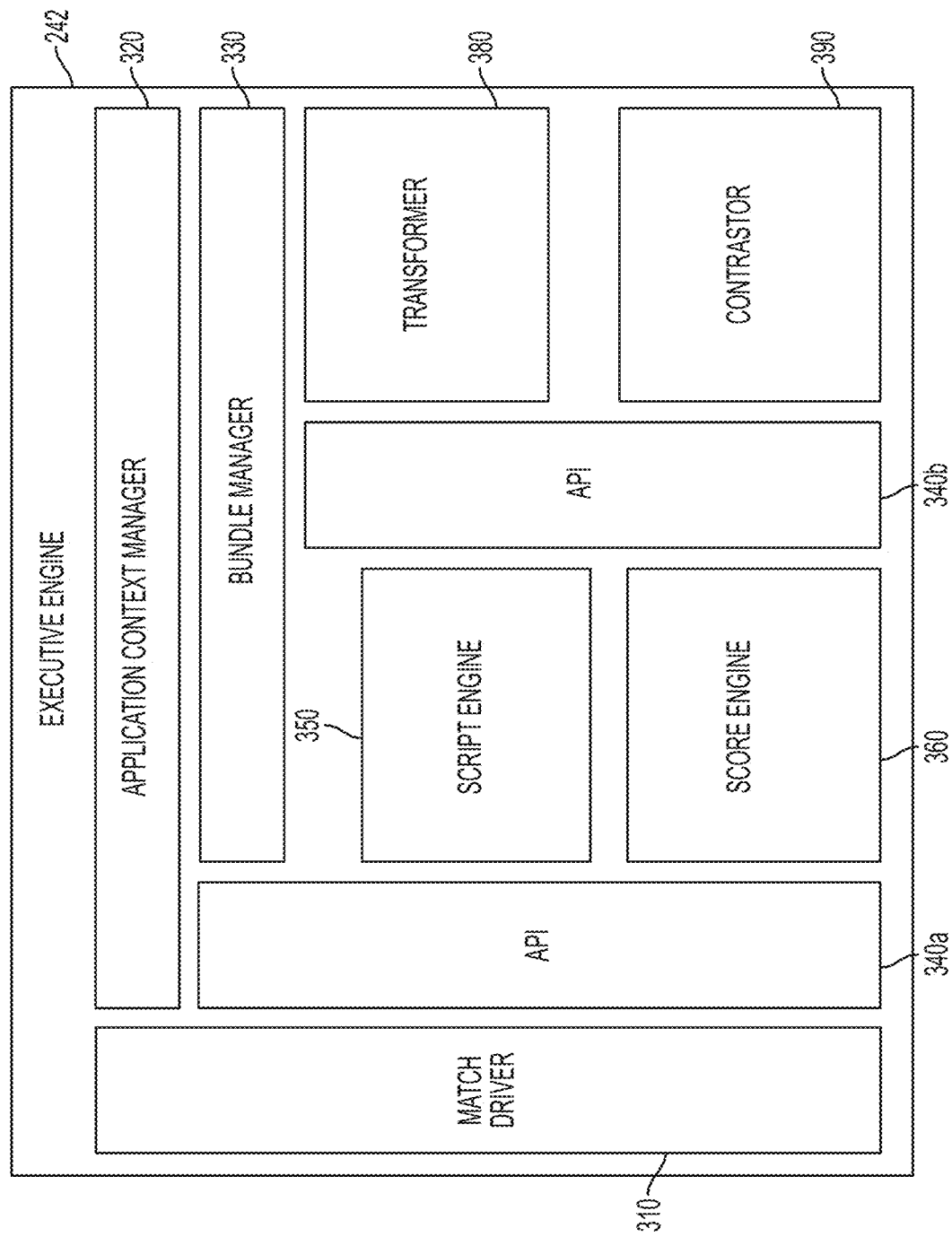
FIG. 3 depicts an example of an executive engine of the global matching system of FIG. 2 according to one aspect of the present disclosure.

FIG. 3 depicts an example of the executive engine 242 depicted in FIG. 2. The executive engine 242 includes various software modules including a match driver 310, an application context manager 320, a bundle manager 330, application programming interfaces ("APIs") 340a-b, a script engine 350, a score engine 360, a transformer 380, and a contrastor 390.

The match driver 310 can include one or more algorithms for receiving input data from a data source. Examples of input data include a spreadsheet, a query, or other data to be matched to target data.

The application context manager 320 can include one or more algorithms for assembling rules or other configuration data used in a matching operation. For example, the application context manager 320 can retrieve one or more rules from a rules library. The rules can be used to control one or more aspects of a matching operation.

The bundle manager 330 can manage internal memory for a matching operation. The bundle manager 330 can track input and outputs from other components of the executive engine 242.

The APIs 340a-b can be used for exchanging data between the global matching system 110 and plug-ins used by the global matching system 110 (e.g., matching tools). The APIs 340a-b can provide data to and from components of the executive engine 242. For example, the API 340a includes a set of routines and protocols for structuring communications between the match driver 310 and each of the script engine 350 and the score engine 360. The API 340a can be used to receive input data and provide results of a matching operation to a computing system or other entity that has requested that the matching operation be performed. The API 340b includes a set of routines and protocols for communication between the a first set of modules (i.e., the script engine 350 and the score engine 360) and a second set of modules (i.e., the transformer 380 and the contrastor 390). For example, the API 340b can include function calls for providing transformed data, which is generated by one or more of the transformer 380 and the contrastor 390, to one or more the script engine 350 and the score engine 360.

A transformer 380 can transform one or more portions of input data into a format that is usable by a given matching tool. The transformer 380 can include one or more transformer modules that can perform operations such as, but not limited to, parsing input data to identify portions of the input data to be matched, removing special characters, and identifying variants for certain names or other data. Identifying variants may include, for example, identifying phonetically similar variants of a name, identifying common nicknames for a proper name or vice versa, identifying different translations or spelling convention for a name (e.g., "Muhammed" versus "Mohammed" or "Lee" versus "Li"), etc. The transformer 380 can augment input data to be matched with these variants. For example, if input data includes the name "Tom Smith" to be matched to target data, a transformer module may add variants such as "Thomas Smith" or "Tommy Smithe" to a set of transformed input data to be compared to target data.

A contrastor 390 can include one or more contrastor modules for executing one or more matching processes to identify similarities or differences between input data and target data.

The script engine 350 can build, aggregate, assemble, or otherwise combine information that is outputted from the contrastor 390, the transformer 380, or both. The script engine 350 can communicate with the contrastor 390, the transformer 380, or both via one of the APIs 340a-b.

The score engine 360 can interpret scores associated with the matching results of different matching processes performed by one or more matching tools (e.g., the contrastor 390). The score engine 360 can determine a quality for a matching result based on the scores. For example, scoring certain results can involve applying a higher weight to results obtained from a matching tool that uses tight matching and applying a lower weight to results obtained from a matching tool that uses loose matching. The score engine 360 can change the flow based on the quality of the matching result.

In some aspects, the executive engine 242 is executed by one or more processing devices to coordinate or otherwise manage a matching operation involving one or more probing cycles and one or more matching tools. A probing cycle is a process of transforming input data based on a set of rules and comparing the transformed data to query results. In a probing cycle, the executive engine 242 can iteratively employ appropriate components and rules depending on the results of previous cycles. The executive engine 242 can access configuration data and determine, based on the configuration data, certain context parameters to be used in the matching operation. For example, the executive engine 242 can determine, based on the configuration data, a type of domain for which the matching is being performed, how to manage memory locations used in the matching process, how to retrieve or process data for the matching operation, how to process data for the matching operation, etc. Configuration data related to data processing can include, for example, data specifying that the first 2-4 lines of an input record are associated with a person (e.g., name, age, sex, etc.) and that the remaining 5-7 lines of the input record are associated with the person's address (e.g., street, state, zip code, etc.).

The executive engine 242 can perform or coordinate data processing for the input data based on the configuration data. In some aspects, data processing can involve the executive engine 242 accessing, calling, or otherwise using one or more transformer modules.

The executive engine 242 can also coordinate one or more matching processes in a matching operation. A matching process can include one or more actions performed by a matching tool that involve comparing, contrasting, or otherwise using the input data to determine similarities to target data or differences from target data. Coordinating the matching process can include, for example, identifying which matching tools are to be used, identifying an order in which the matching tools are to be executed, identifying the data to be provided to each matching tool (e.g., common sets of input data, input data plus results outputted by another matching tool, etc.). For example, the executive engine 242 can identify a first matching tool that uses loose matching, identify a second matching tool that uses loose matching, execute the first matching tool for filtering the input data, and execute the second matching tool to match the results of the loose matching to certain target data. In some aspects, the executive engine 242 can perform or coordinate one or more scoring-related operations for results obtained by executing one or more matching tools.

The adaptive executive engine 242 can manage, coordinate, or otherwise use query results for matching the input data to certain target data. In one example, the global matching system 110 can identify different facets of input data. Examples of these facets include one or more names of entities, one or more addresses, etc. The global matching system 110 can prepare the data for use with different matching tools. Preparing the data can include, for example, hashing, parsing, or otherwise transforming input data into a form that is usable by an appropriate matching tool. The global matching system 110 can provide the transformed data to one or more matching tools. Matching tools can include, for example, comparator modules, contrastor modules, or some combination thereof. A matching tool can determine whether certain input data (e.g., a string obtained from the input data) matches certain target data.

The executive engine 242 can manage a probing cycle based on one or more rules. Rules can include, for example, criteria identifying whether to continue a probing cycle after a result has been obtained. For instance, a rule can specify or otherwise indicate what type of information is required from a matching operation to make a decision or otherwise perform some other operation based on the results of the matching operation.

In a probing cycle, the executive engine 242 can employ an iterative process of comparing input data (e.g., parse, tokenize, etc.), comparing or contrasting input data to target data, and scoring the results of compare or contrast operation for one or more facets of one or more input data records. The executive engine 242 can select appropriate components (e.g., rules, matching tools, etc.) based on the current likelihood of a match state. For example, if a clear discrepancy or agreement is determined from a given iteration of an iterative matching process, the matching process may halt iteration. Otherwise, the global matching system 110 can use rules to employ a subsequent cycle to effectively add to the evidence or a likelihood of the match state.

The executive engine 242 can coordinate different processes performed by different plugins. Examples of these plugins include one or more matching tools that include algorithms for matching input data to certain names, one or more algorithms for matching input data to certain geographical addresses, one or more algorithms for matching input data to certain social media profiles, one or more algorithms for matching input data to certain email addresses, etc. Plugins can be customized for use in the global matching system 110. Plugins can be off-the-shelf plugin for use in any matching architecture.

Performing Matching Operations

Figure 4:
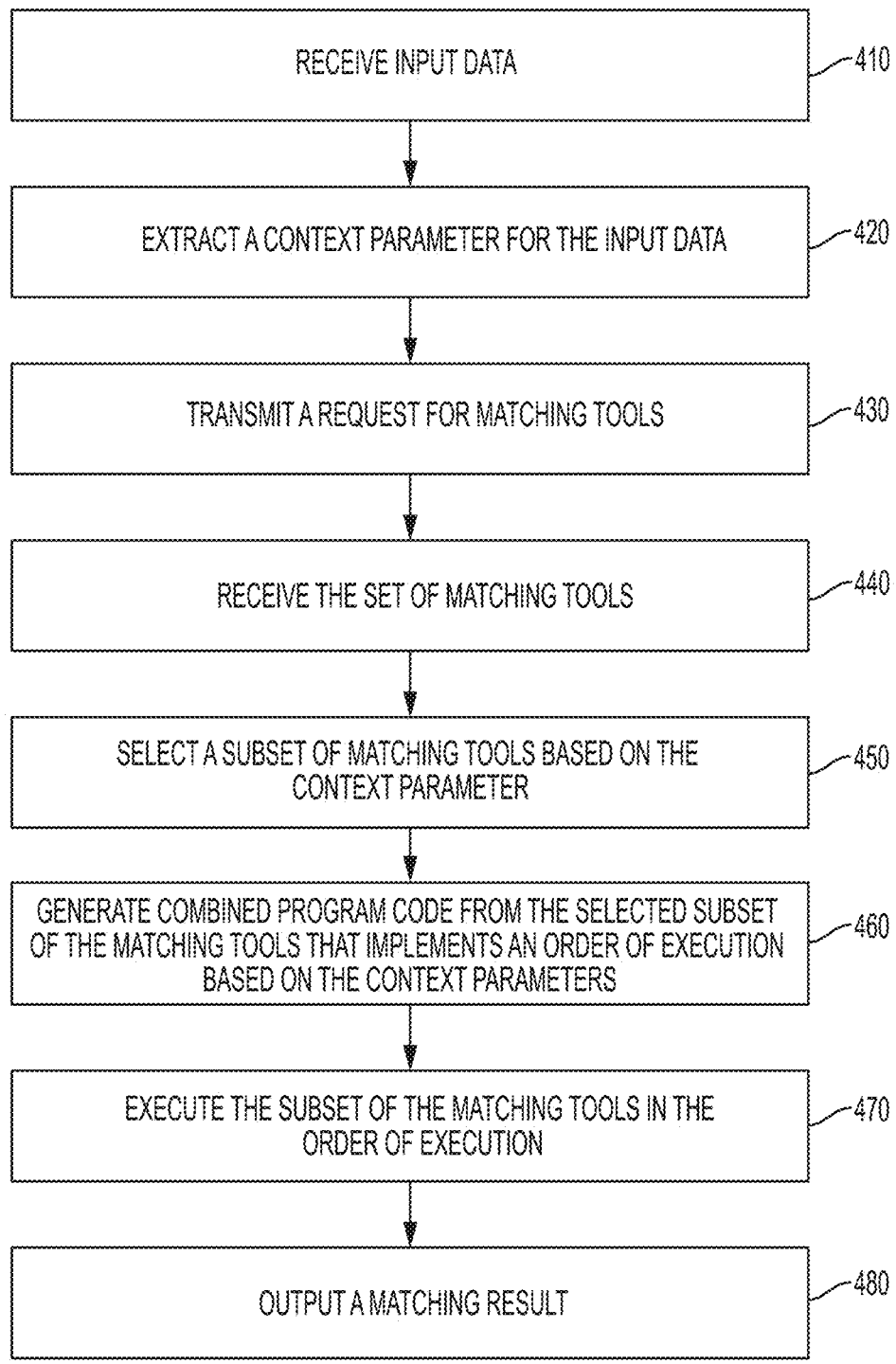
FIG. 4 depicts an example of a process for globally matching data according to one aspect of the present disclosure.

Any suitable matching operation can be implemented by the global matching system 110. FIG. 4 is a flow chart depicting an example of a process that can be executed by the global matching system 110 in FIGS. 1-2. The process can be implemented using one or more of the examples described herein. Other implementations, however, are possible.

In block 410, the global matching system 110 receives input data to be matched to target data. For example, the processing device 120 that executes the executive engine 242 (or other suitable program code for the global matching system 110) can receive an electronic signal including the input data to be matched to the target data stored in the data sources 150. In some aspects, the processing device 120 can receive input data via the data network 104 from one of the remote client devices 102a-c. In additional or alternative aspects, the processing device 120 can receive input data via a graphical interface (or other suitable interface) that is displayed by a display device communicatively coupled to or included in a client device that includes the processing device. The input data can include any type of data to be matched to target data (e.g., one or more names of individuals, one or more names of businesses, one or more geographic addresses, etc.).

In block 420, the global matching system 110 extracts a context parameter for the input data. For example, the processing device 120 can execute the executive engine 242 (or other suitable program code for the global matching system 110) to extract one or more context parameters for the input data by transforming the input data into tokens and matching the tokens to one or more a person classification and business classification. A person classification can indicate whether input data refers to a person or to personal use and a business classification can indicate whether input data refers to a business or to commercial use. A context parameter can include, for example, data indicating a location-specific characteristic or culturally specific characteristic of an entity associated with the input data, as described above with respect to FIG. 2.

In block 430, the global matching system 110 transmits a request for matching tools. For example, the processing device 120 can execute the executive engine 242 (or other suitable program code for the global matching system 110) to transmit an electronic signal including a request for matching tools to a match server. The matching tools can include program code portions for matching different types of input data to target data. In block 440, the global matching system 110 receives a set of matching tools based on the request. For example, the processing device 120 can receive, from the match server, an electronic signal including the set of matching tools.

In block 450, the global matching system 110 selects a set of matching tools for the identified context. For example, the processing device 120 can execute the executive engine 242 (or other suitable program code for the global matching system 110) to access matching tools that include algorithms for matching different types of input data to target data. The matching tools can include computer-executable program code that is in the non-transitory computer-readable medium 240 accessible to the processor 230 (e.g., via a local memory or via a data network). The processing device 120 can select a subset of the matching tools that correspond to one or more context parameters identified for the input data by the processing device 120.

In block 440, the global matching system 110 identifies an order of execution for the selected matching tools based on the identified context. For example, the processing device 120 can execute the executive engine 242 (or other suitable program code for the global matching system 110) to identify access configuration data stored in the non-transitory computer-readable medium 240. The configuration data can indicate that certain matching tools being executed in a certain order can be used to implement a desired matching operation for a certain context. The processing device 120 can identify, based on the configuration data, the order of operation for the selected matching tools that can provide a desired matching functionality for input data with the identified context.

In some aspects, the processing device 120 transforms input data for use with the matching tools. For example, the processing device 120 can identify one or more transformation operations for transforming the input data into a format suitable for use by one or more of the selected matching tools. The processing device 120 can apply one or more appropriate transformation operations to generate transformed input data in the identified format. Applying a transformation operation can include, for example, accessing a transformer plug-in or other module that is stored in a non-transitory computer-readable medium 240 and executing the transformer plug-in.

In block 460, the global matching system 110 generates combined program code from the selected subset of the matching tools that implements an order of execution for the subset of the program code portions in the subset of the matching tools based on the context parameter. In block 470, the global matching system 110 can execute the matching tools in the identified order of execution. For example, the processing device 120 can execute the combined program code implementing operations of the subset of the matching tools in the order of execution and thereby cause the match server to retrieve a matching result from the data sources. In some aspects, involving transformed input data, the processing device 120 can provide transformed input data to one or more of the selected matching tools that are executed in the identified order.

In block 480, the global matching system 110 can output a matching result for the input data and the target data. For example, the processing device 120 can execute the executive engine 242 to obtain a result for a matching operation based on executing the selected matching tools in the appropriate order. In some aspects, the processing device 120 can transmit the matching result to one of the remote client device 102a-c via the data network 104. In additional or alternative aspects, the processing device 120 can iteratively execute the selected matching tools in the identified order of execution, and can cease the iteration based on applying at least one context-specific rule to the output. A context-specific rule can include a rule based on any characteristics of the input data, the entity requesting the match results, or potential target data. For example, the context-specific rules can include rules based on the input data including a personal name and an address in the United States. Any suitable matching operation can be implemented by the global matching system 110.

Figure 5:
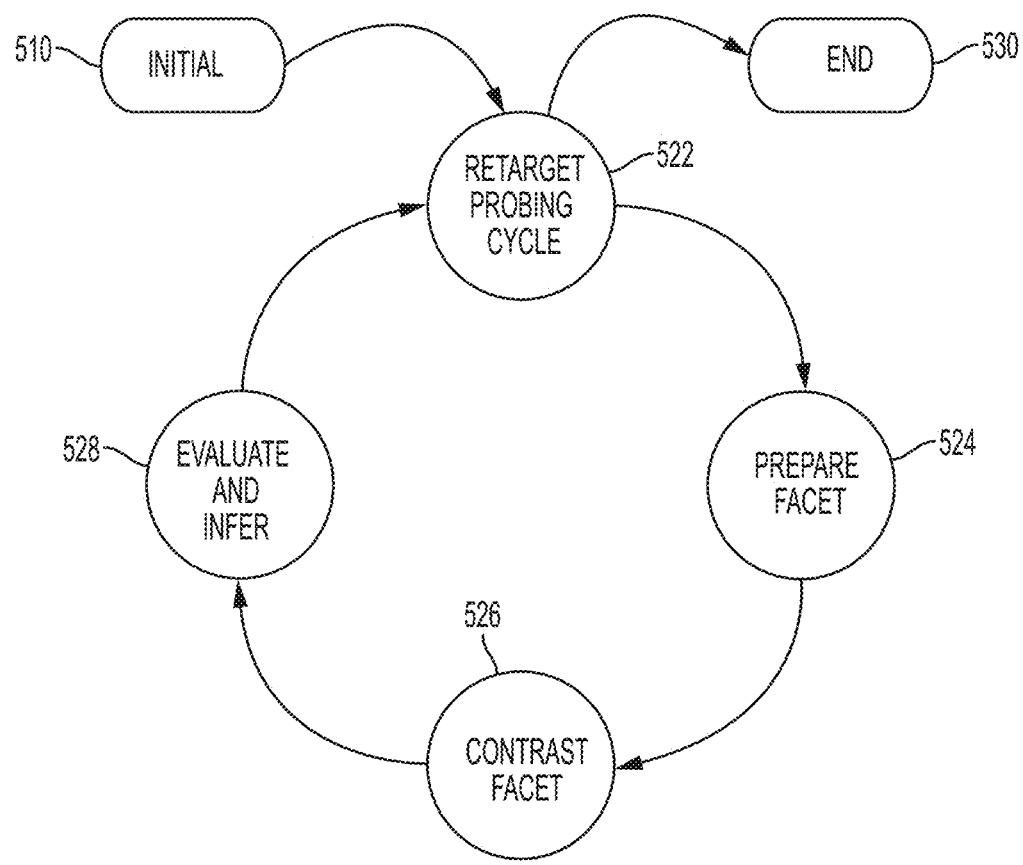
FIG. 5 depicts an example of a process for generating a search path for a global matching system according to one aspect of the present disclosure.

Executing a set of matching tools can be performed over several probing cycles and can include an iterative process of transforming the input data, querying databases, and comparing the input data with the query results. FIG. 5 depicts an example of a process for performing a series of probing cycles to execute a set of matching tools for the global matching system 110 in FIG. 1. The process can be implemented using one or more of the examples described herein. Other implementations, however, are possible.

In block 510, the match server 160 initializes a probing cycle for performing one or more matching operations based on receiving input data from one of the client devices 102a-c. The input data can be received as part of a packet with a request to match the input data to target data stored in a memory device. The input data can include any identifying information associated with an entity (e.g., an individual or a business).

In block 522, the probing cycle is retargeted by the processing device 120. The probing cycle can be retargeted based on the input data to return a set of query results. Retargeting the probing cycle can include selecting a new database to query or a new set of rules based on the results of a previous probing cycle. In some examples, the probing cycles can be ordered in a tiered approach. For example, in a tiered approach, the global matching system 110 can perform tight matching first, and can then perform loose matching based on the results of the tight matching. Such an example may involve finding a threshold number of candidate entities that potentially match certain criteria. A tight matching process can be applied first to identify a first number of candidates (e.g., 75% of the desired threshold). A looser matching process can then be applied to identify a number of additional candidates (e.g., another 20% of the desired threshold). An even looser matching process can then be applied to identify a number of additional candidates (e.g., another 5% of the desired threshold).

If the matching operation is complete (the query results or target data matches the input data), the global matching system 110 may move to block 530. Otherwise, the global matching system 110 proceeds to block 524.

In block 524, the global matching system 110 prepares the facets. The facets can include individual data fields of the input data, which can be determined by the global matching system 110. In some examples, the global matching system 110 can cleanse, tokenize, parse, normalize, harmonize, or hash the facets. In block 526, the global matching system 110 contrasts the facets with query results from the probing cycle. In some examples, the global matching system 110 determines similarities or differences between the facets with the query results based on features of the input data and domain rules. In block 528, the global matching system 110 evaluates the input data to determine a relationship between the input data and the query results (e.g., the input data is the same, likely the same, disjoint, or unlikely to be related).

In block 530, the global matching system 110 can output the matching result for the input data including a success or failure of finding a match. In some examples, the global matching system 110 can include (or be communicatively coupled) to a display device (e.g., a monitor). The global matching system 110 can output the matching results on the display device. In additional or alternative examples, the global matching system 110 can transmit the matching results to one of the client devices 102a-c for outputting using a printer, speakers, or any suitable output device coupled to the client devices.

Figure 6:
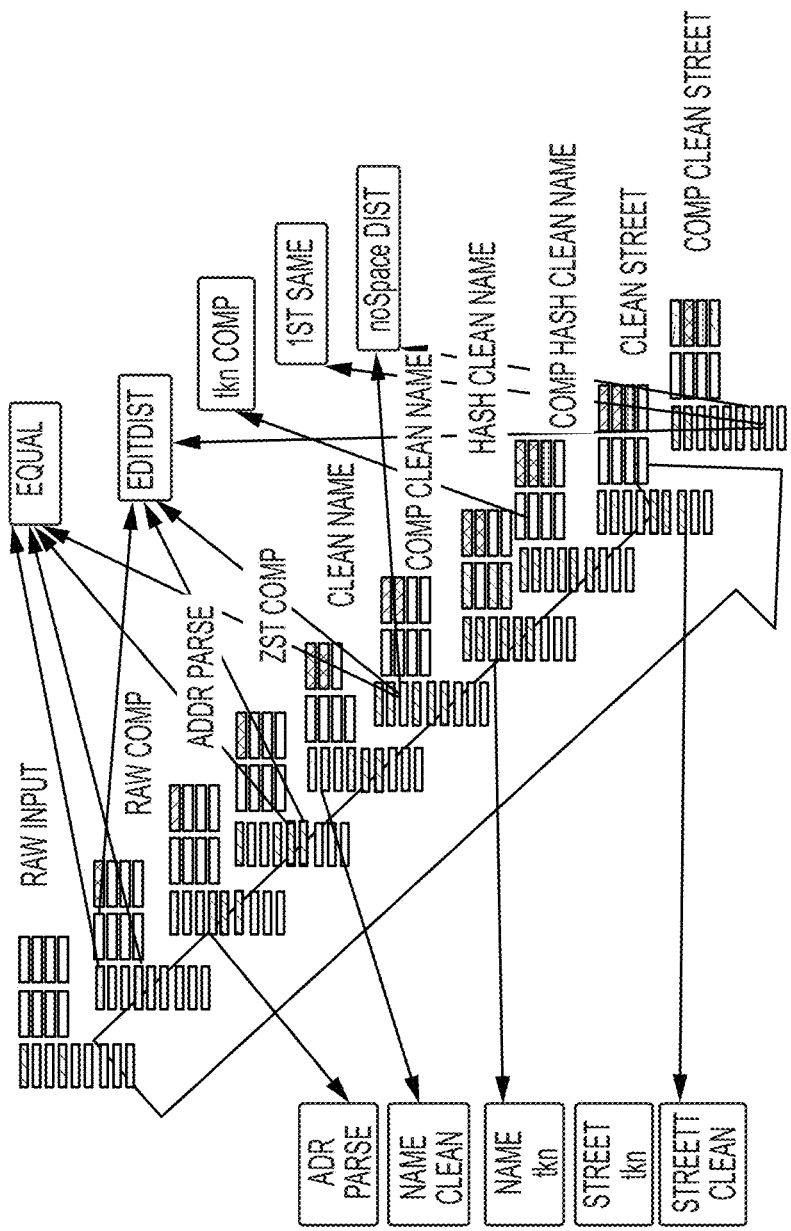
FIG. 6 depicts an example of a matching operation that can be performed by the global matching system according to one aspect of the present disclosure.
Figure 7:
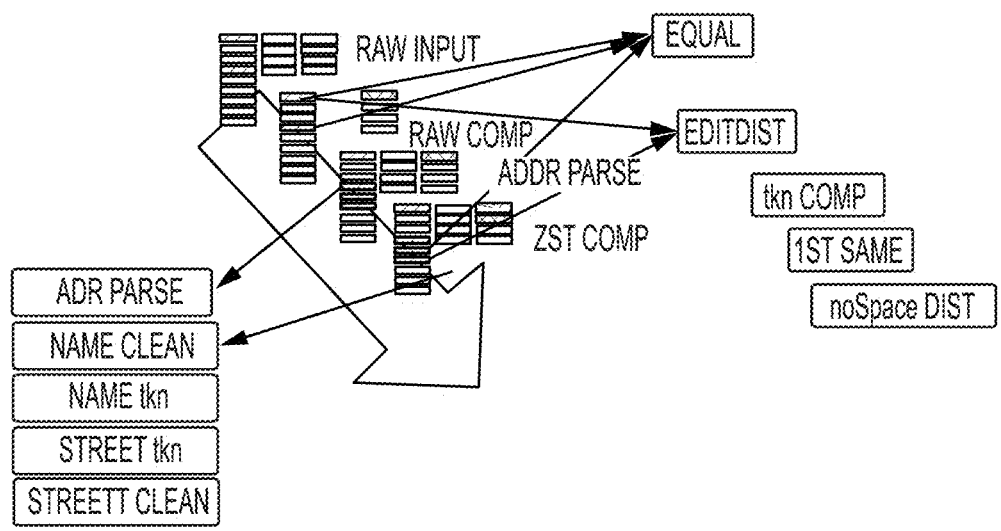
FIG. 7 depicts another example of a matching operation that can be performed by the global matching system according to one aspect of the present disclosure.

FIGS. 6-7 depict examples of a matching operation that can be performed by the global matching system 110 receiving the input data "COMPANY X INVESTIGATION SCIEN, 1234A STREET-NAME INDUSTRIAL WY #123 SUWANEE, Ga. 30024." In FIG. 6 the input data is processed and matched to a record with the data "COMPANY X INV AND SCI 1234-A STREET-NAME SUWANE Ga. 30024." In FIG. 7 the input data is processed and matched to a record with the data "COMPANY X INVESTIGATIONS SCIEN 1234A PTREE INDUSTRIAL WY #123 DULUTH Ga." In these examples, the global matching system 110 receives the same raw name and raw address. The global matching system 110 requires matches to have the same primary, town, state, and zip. In each example the global matching system 110 transforms the input by cleaning the punctuation and spacing, removing noise words, parsing the address. Then the global matching system 110 compares the transformed distance with target data using edit distance, substring, or hash-token sets.

Figure 8:
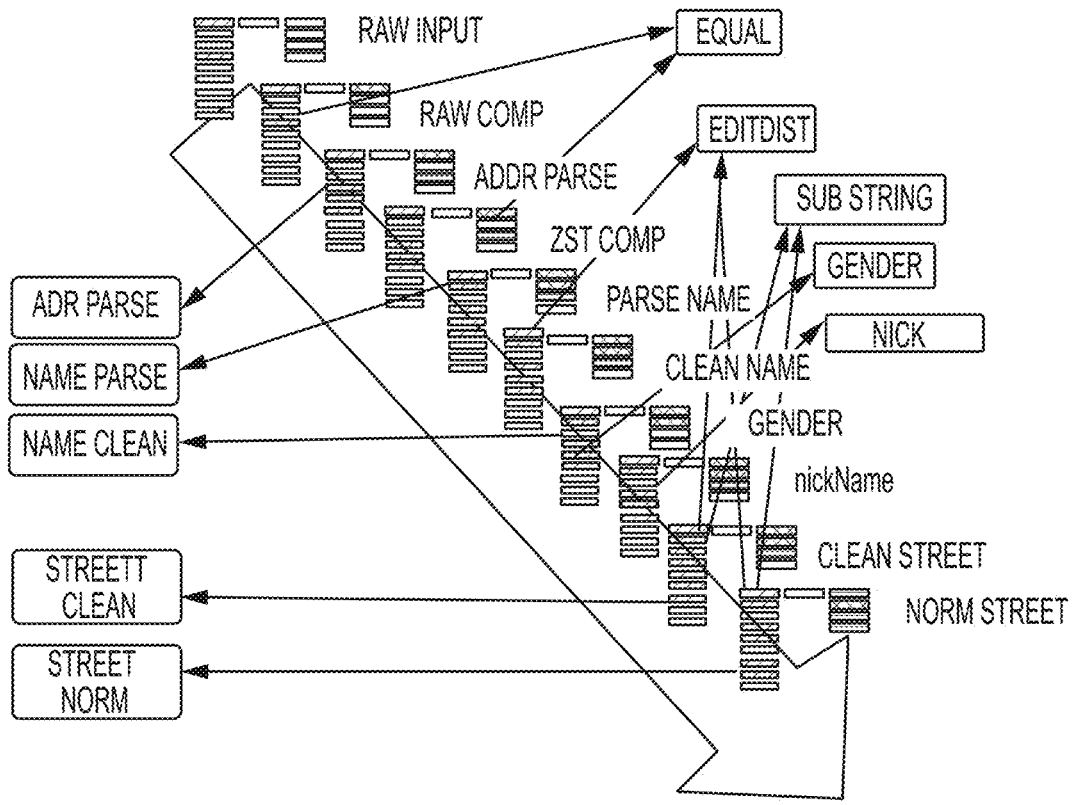
FIG. 8 depicts another example of a matching operation that can be performed by the global matching system according to one aspect of the present disclosure.
Figure 9:
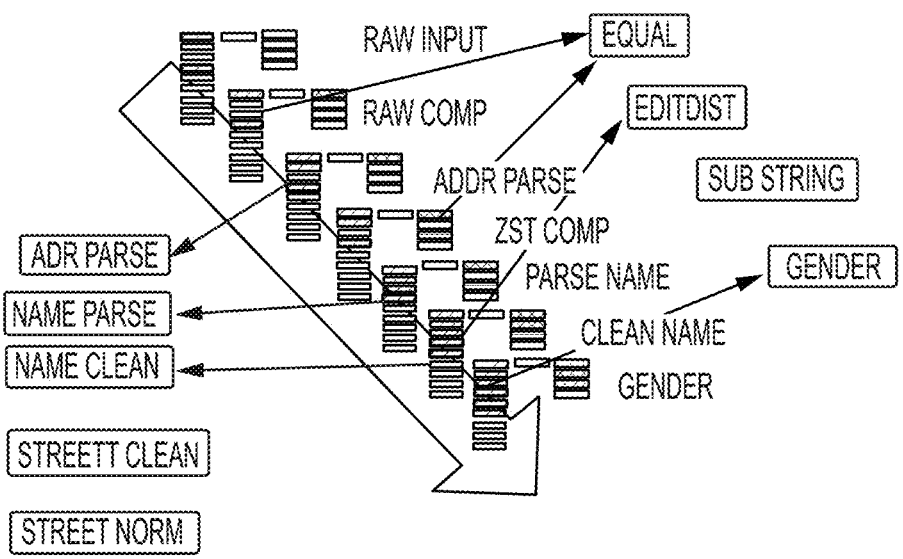
FIG. 9 depicts another example of a matching operation that can be performed by the global matching system according to one aspect of the present disclosure.

FIGS. 8-9 depict examples of a matching operation that can be performed by the global matching system 110 receiving the input data "ROBERTA SUSAN SNUFFY, 1234 NORTH STREET NAME HOUSTON Tex." In FIG. 8, the input data is processed and matched to a record with the data "BOBBIESUE SNUFFY 1234 N STREET NAME #D HOUSTON Tex. 77039." In FIG. 9, the input data is processed and matched to a record with the data "ROBERT S SNUFFY 1234 NORTH ST HOUSTON Tex. 77049." In these examples, the global matching system 110 receives the same raw name and raw address. The global matching system 110 can be configured to require matches having the same primary, town, state, and zip. In each example the global matching system 110 transforms the input by cleaning the punctuation and spacing, removing noise words, parsing the address. The global matching system 110 compares the transformed distance with target data using edit distance, substring, or based on gender and nicknames. In some aspects, the input data for an individual may include other data such as birth date, associated accounts, phone number, former address, former names, or identification numbers (e.g., driver's license number).

Figure 10:
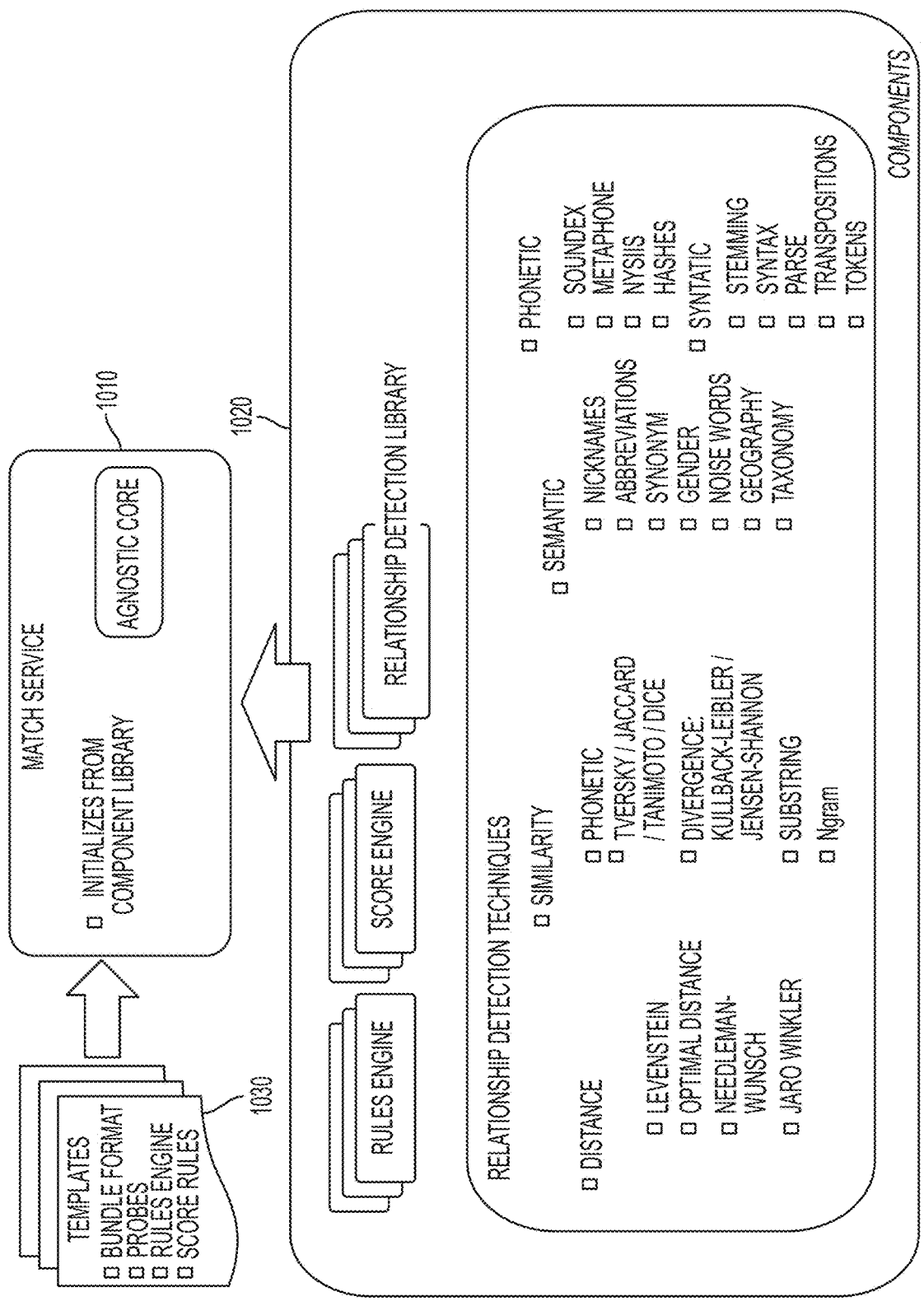
FIG. 10 depicts an example of pluggable components that can be used by a match service in a global matching system according to one aspect of the present disclosure.

FIG. 10 depicts an example of pluggable components 1020 that can be used by a match service 1010 in the global matching system 110. The match service 1010 can be executed by the processing device 120 and include other modules discussed above. The templates 1030 can be provided to the match service and include a predetermined bundle format, probing cycles, rules engine, and score rules. The pluggable components 1020 can include different rules engines, score engines, relationship detection libraries, as well as standard relationship detection techniques. The standard relationship detection techniques can include techniques for comparing data including edit distance (e.g., levenstein, optimal distance, Needleman-Wunsch, or Jaro Winkler), similarity (e.g., phonetic, Tversky/Jaccard/Tanimoto/Dice, divergence, substring, Ngram), semantic (e.g., nicknames, abbreviations, synonyms, gender, noise words, geography, taxonomy), phonetic (e.g., soundex, metaphone, NYSIIS, hashes), and syntactic (e.g., stemming, syntax, parse, traspositions, tokens).

Figure 11:
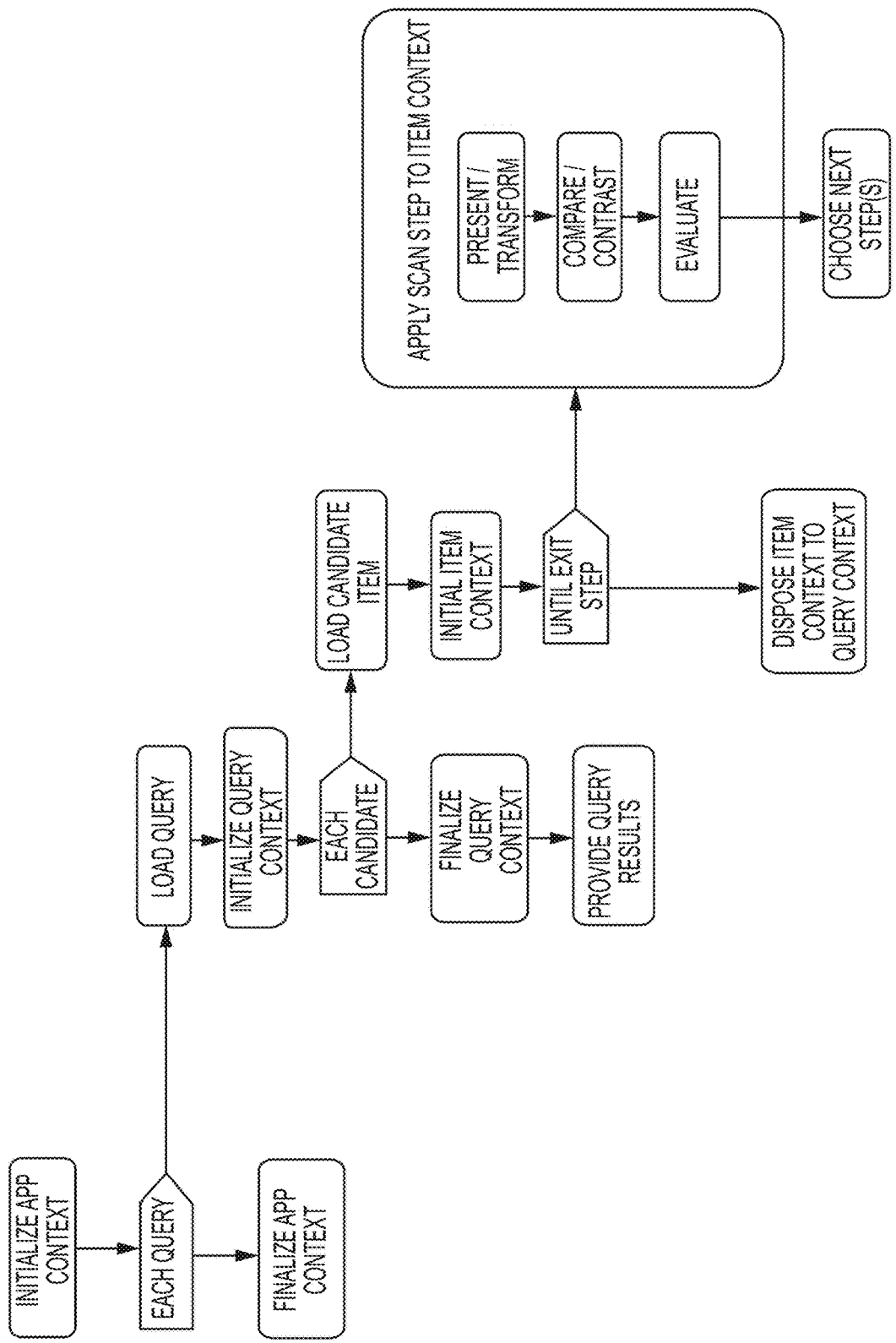
FIG. 11 depicts an example of various actions that can be performed by a match server of a global matching system that communicates with various clients during a matching operation according to one aspect of the present disclosure.

FIG. 11 depicts an example of how different modules can be used by the global matching system 110 to execute a matching operation. In this example, a particular match instance can be assembled from standard matching functions, custom matching functions, or some combination thereof. This example can illustrate how the global matching system 110 may improve the efficiency, efficacy, or both for implementing a matching system applicable to multiple contexts.

Figure 12:
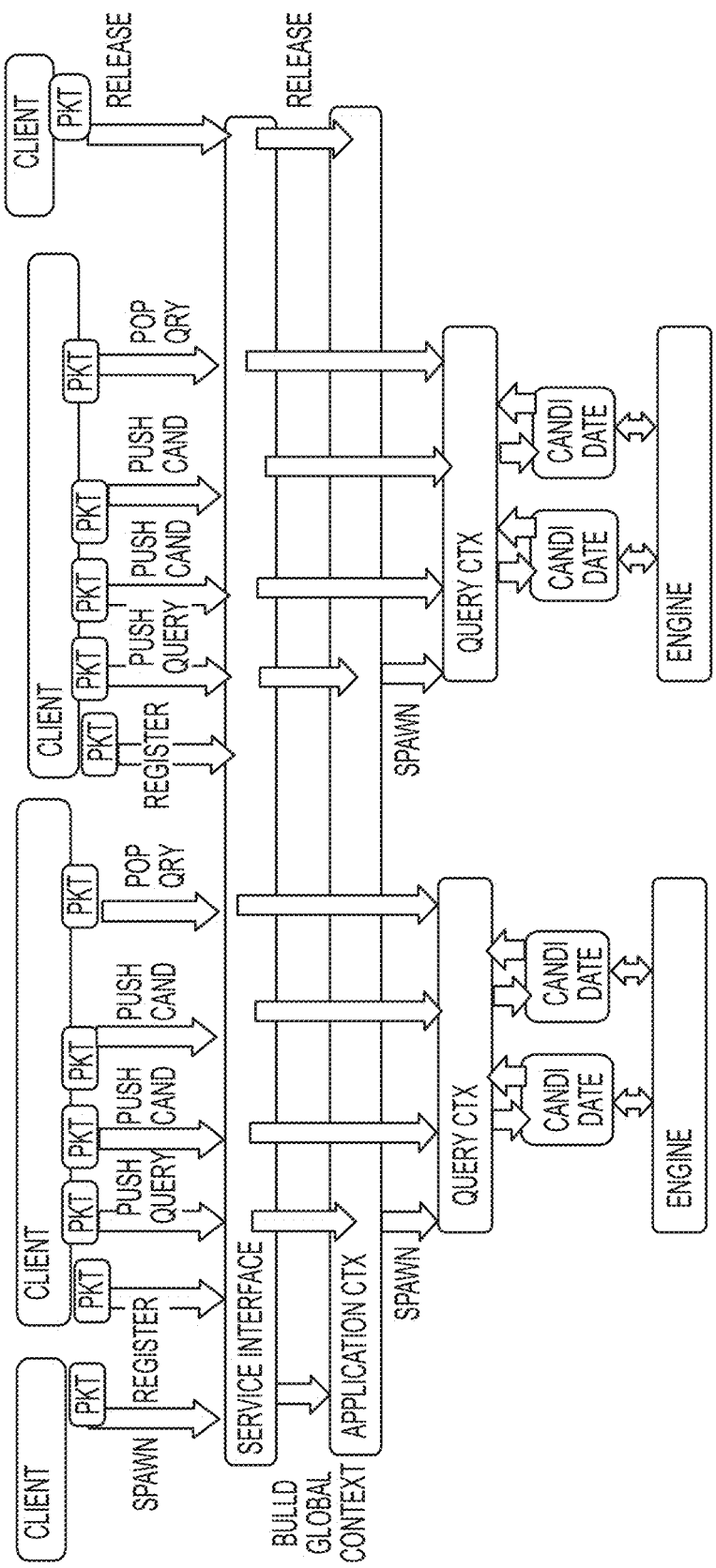
FIG. 12 depicts an example of how information may flow between clients and the global matching system that executes a matching operation according to one aspect of the present disclosure.
Figure 13:
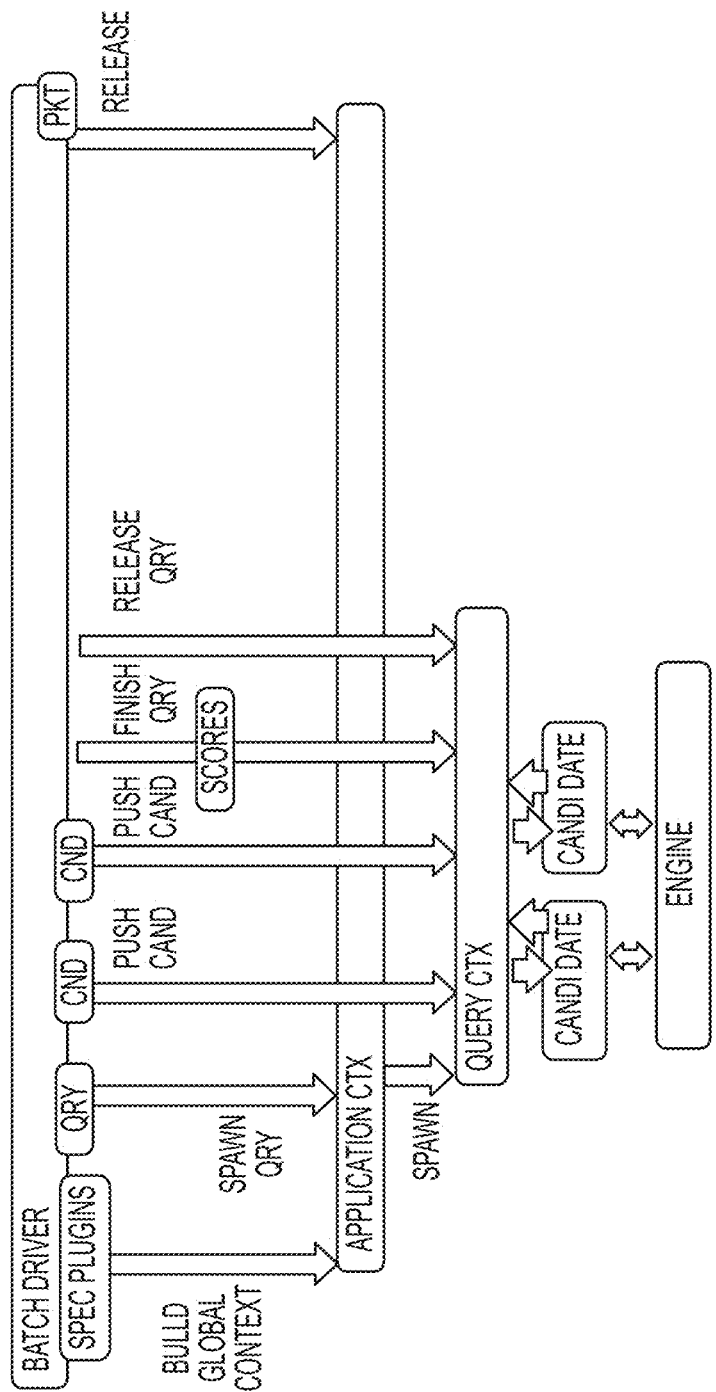
FIG. 13 depicts an example of how a global matching system can implement a batch process for a matching operation according to one aspect of the present disclosure.

FIG. 12 depicts an example of how information may flow between clients and the global matching system 110 that executes a matching operation according to one aspect of the present disclosure. In some aspects, the packets can maintain state and interface information. The application can include global plugins (e.g., bundle and context builders, rules and formats, object instances). FIG. 13 depicts an example of how the global matching system 110 can implement a batch process for a matching operation. The batch driver can perform service features including building global context and maintaining object pointers.

Hierarchy of a Global Matching System

Figure 14:
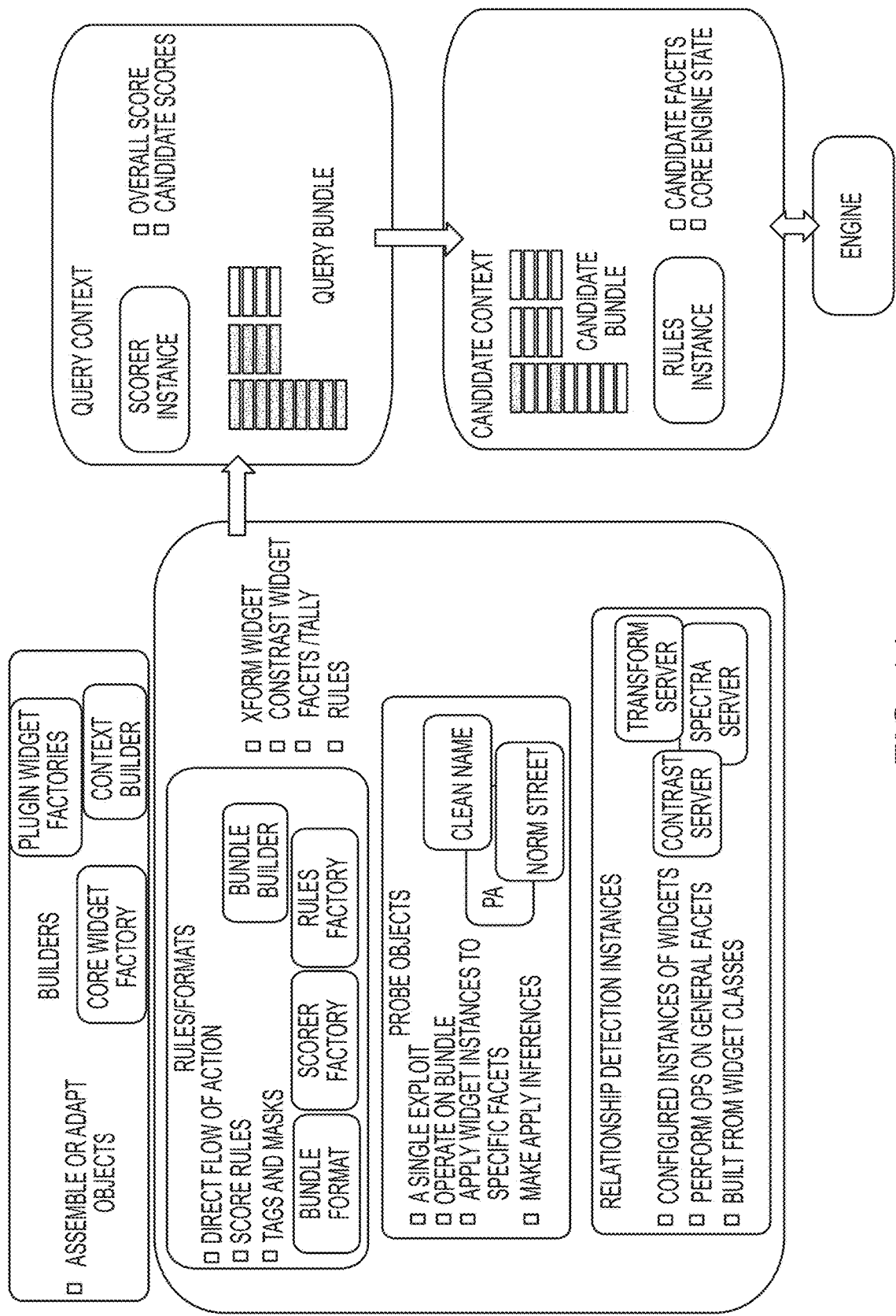
FIG. 14 depicts an example of a component hierarchy for a global matching system to execute a matching operation according to one aspect of the present disclosure.
Figure 14:
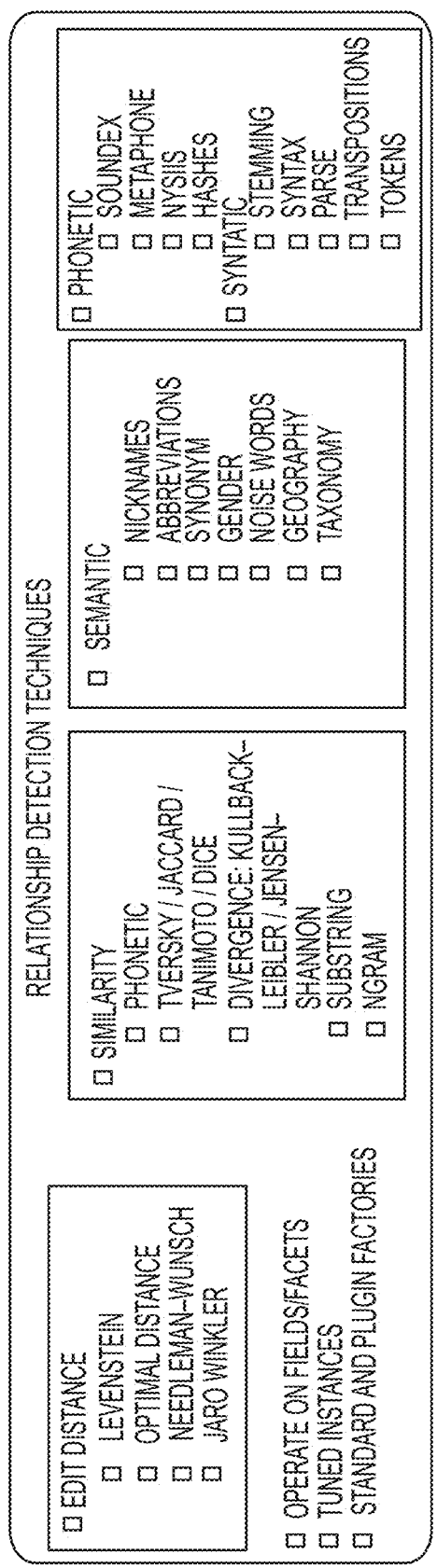

The global matching system 110 can include various components, which can be interchangeable to adjust matching operations based on context parameters. FIG. 14 depicts an example of a component hierarchy for the global matching system 110 to execute a matching operation. In this example, match operation can be factorized into configurable, interoperating objects that implement operations in a match space. The objects can conform to the layered model depicted in FIG. 1. The structuring of the gestalt or context-layer can facilitate one or more of looser coupling, interoperability, and combination of piece parts.

In some aspects, the rules executed by the global matching system 110 can determine an efficiency of the match server. The rules can provide the intelligence that link relationship detection techniques into an overall solution. Rules can use the data produced by the relationship detection techniques to determine tactics and sufficiency for matching and scoring. Selecting the rules can include considering interoperability considerations, configuration considerations and conduct considerations. The interoperability considerations can include ensuring low impedance access to facts and inferences in a match bundle, interoperability with invocations of relationship detection techniques on specific facet, and maintaining rule a match state within an appropriate thread contexts for candidate and query. Configuration considerations can include agnostic intuitive paradigm that is configurable to multiple domains and facilities to refine and extend rules. Conduct considerations can include ensuring the rules produces the same overall result for equivalent queries, are independent of the sequence of candidates, are independent of the inference sequences for a single candidate, have low cost resets for query and candidate shifts, and facilitate reasons for actions and inferences.

Different matching techniques can be used by matching tools in the global matching system 110. For example, matching tools can use a canned sequence, a decision tree, a state network, or a production system. A canned sequence can include performing a fixed number of steps in a specified sequence, which may end when a threshold is met. For example, given two strings, a canned sequence can i) determine if the strings are equal; ii) determine if the strings are equal if spaces are stripped from the strings; and iii) determine if the strings are equal other than the presence of a suffix. A canned sequence can be used for filtering same or similar profiles. A decision tree can include choosing a sequence of scans based on the results of previous scans. A decision tree can be used when comparing data with different nuances or multiple aspects (e.g., name and address). For example, a decision tree can include determining if addresses match in response to determining that names match. A state network can include scanning nodes and transitions to subsequent nodes based on previous results. A state network can be used to handle complex logic or when a decision tree becomes cumbersome. In one example, a state network can be used to check input name and address, then if address is different check city and state or if name is the same, then clean the address. A production system can include an inference engine or production such as one based on rete. A production system can be used when rule complexity makes Boolean transitions cumbersome, for example, due to coupling different match fields or domain dependent concerns. For example, a production system can apply different techniques depending on whether a business name appears to be a church, a professional, or a government office. The domains may be parsed and somewhat normalized. The engine might contain rules for identifying the domains as well as top level rules such as name same.

FIGS. 15-18 are charts depicting examples of layers of operation and parts of a global matching system to coordinate matching operations. In this example, a layered service model is used to organize certain functions and architectural features of a global matching system, which can facilitate interoperability and extendability.

Figure 19:
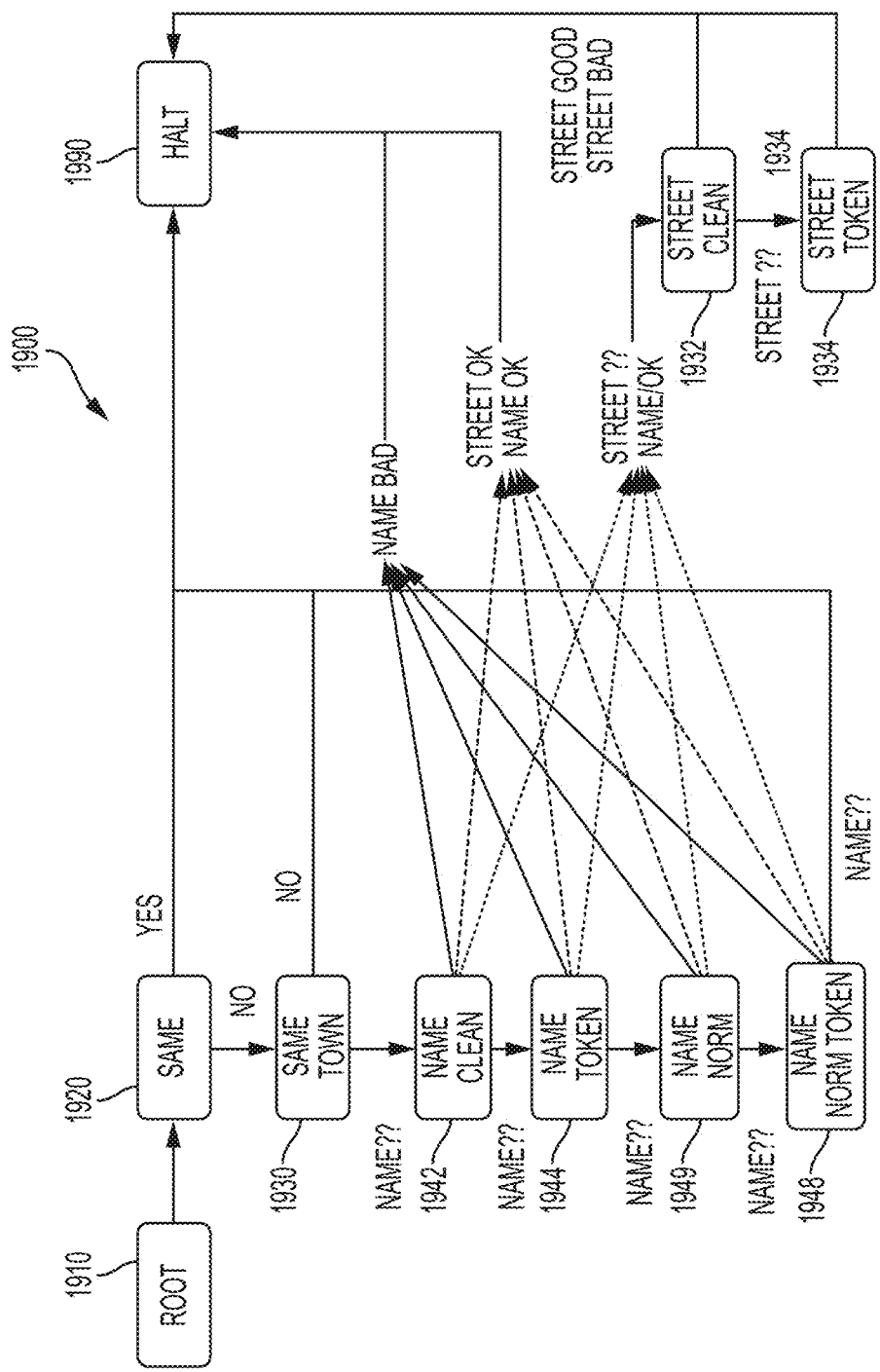
FIG. 19 depicts an example of a multi-facet match rules network that can be used by the global matching system according to one aspect of the present disclosure.

FIG. 19 depicts an example of a multi-facet match rules network that can be used by the global matching system 1900 according to one aspect of the present disclosure. The matching operation can start in node 1910 and stop at node 1990. In node 1920, the global matching system 1900 can compare the input name and address to query results. The global matching system 1900 can proceed to the node 1990 if the name and address are the same or blank. The global matching system 1900 can proceed to node 1942 if the address is the same. Otherwise the global matching system 1900 can proceed to node 1930. In node 1930, the global matching system 1900 can parse the input address into categories (e.g., street, town, and zip fields). The global matching system 1900 can compare each category with query values. The global matching system 1900 can proceed to node 1990 if none of the categories are the same or if the name is the same and one of the categories. The global matching system 1900 can proceed to nodes 1932 if only the name is the same. Otherwise, the global matching system 1900 can proceed to the node 1942. In node 1942, the global matching system 1900 cleans the input name by removing spurious characters and words, saves the cleaned name to memory and compares the cleaned name to query results. If the street and the clean name match a query result, the global matching system 1900 can proceed to node 1990. If the clean name matches, the global matching system 1900 can proceed to node 1932. Otherwise, the global matching system 1900 can proceed to node 1944. In node 1944, the global matching system 1900 can tokenize words from the clean name and store the tokens in memory. The global matching system 1900 can compare the clean name tokens with query results. The global matching system 1900 can proceed to node 1990 if the name token is substantially different, the name token is the same and the street is the same, or the name is similar and the street is the same. If the cleaned name is likely the same the global matching system 1900 can proceed to node 1932. Otherwise, the global matching system 1900 can proceed to node 1946. In node 1946 and 1948, the clean name can be normalized and the normalized clean name can be tokenized. In node 1932, the street can be cleaned and in node 1934 the clean street can be tokenized. The similar conditions for proceeding to different nodes can be performed by nodes 1932, 1934, 1946, 1948. The transitions may be designed to improve performance by avoiding unnecessary steps, halting when sufficient information gleaned, and trying more discerning comparisons.

Core Engine Framework Perspective

In some aspects, the global matching system 110 (or the global matching system 1900) can be implemented using a core engine framework. The core engine framework can include a core match framework and the core components that extend the framework through coding or third-party tool integration.

In some aspects, the core engine framework can include an application context governing context of the system. In additional or alternative aspects, the core engine framework can include bundle management. Bundle management can manages internal memory that is organized around the working bundle. A bundler can manage storage through externalized access points that are extended by plugins or third party tools. In additional or alternative aspects, the core engine framework can include data marshalling. Data marshalling controls the marshalling of meta-bundle variables between the support libraries (e.g., transform and contrastor algorithms) and core implementations (e.g., rules engine, score engine, etc.). In additional or alternative aspects, the core engine framework can include module management. Module management can manage access to system extension modules such as the support libraries (e.g., transform and contrastor algorithms) and core implementations (e.g., rules engine, score engine, etc.). In additional or alternative aspects, the core engine framework can include a table manager. The table manager can manage meta-controlled tables of information. In some examples, meta-controlled tables of information include gender tables, city/zip tables, stop keywords, business abbreviations, etc. In additional or alternative aspects, the core engine framework can include a trace processor. The trace processor can trace interactions with bundle, data marshalling, and module access. A trace processor library can be extendable into support libraries (e.g., transform and contrastor algorithms) and core implementations (e.g., rules engine, score engine, etc.).

The global matching system 110 can also include features for managing a balance of a "good match" versus a "bad match." Examples of features for managing this balance can include: configuration and validation, tuning, match results explanations, and debugging information.

The global matching system 110 can also be used to customize matching operations for certain domains. In some aspects, a core engine framework used to provide domain-specific customization can include application context extension. Extending this object, the global matching system 110 can add further capabilities beyond a basic framework. In additional or alternative aspects, the core engine framework can include a Bundle Builder. Data within an executive engine can be represented in a standard meta-bundle format. The bundle builder can construct meta-bundles that take an internal physical form of data. The bundle builder can convert the data into a normalized meta-controlled bundle structure. Bundle processing can support external meta-mapping to the internal meta-format that is managed through configuration descriptors. The meta-bundle structure can be used to maintain a progression of match state in the form of dynamically enhanced data fragments.

The global matching system 110 can use one or more libraries of program code. Some examples of these libraries include transform built-ins and contrastor (or comparator built-ins (or extensions). Transform built-ins can be used to parse, cleanse, or normalize. The raw data values can be transformed into normalized token or string values. These values may be used by modules such as a rules engine, a scorecard processor, and contrastors. Externalized address or name standardizer technology are tools that can be used to handle the transformation of data. String routines can be used to clean up special characters, concatenate or separate words, etc. Tokenizers can normalize data using some algorithmic process. Examples of tokenizers can include Ngram, DoubleMetaphone, and Soundex routines. The comparator library can include one or more algorithms that provide value when matching two data elements together. The library can include string algorithms such as Levenshtein, Largest Common Substring, Optimal Distance, Space Distance, Jaro Winkler, etc. Any new algorithm or value necessary to support a domain can be added to this library. A marshalling interface between the algorithm, script engine, and bundle data can be used to enable the library.

The global matching system 110 can also include one or more core extensions. Examples of these extensions can include rules engine extension and score card extension. The rules engine extension may exist as a third party or open source tool, DSL implementation, or based on a common Programming Language (e.g., v8 Javascript). A rules engine can support the ability to progressively flow between bundled data, contrastors, and built-in libraries. The rules engine can manage a flow of events (e.g., parse, clean, contrast data as necessary). The parsed, cleansed, and contrasted data can be accumulated in the flow and reused, if appropriate, as the process drills deeper into the data during a probing cycle or other matching operation. The rules engine can extend its data model to use a meta-controlled bundler. In some aspects, the rules engine can include rules that provide the intelligence that link relationship detection techniques into an overall solution. In additional or alternative aspects, the rules engine can include rules that use the facts that relationship detection techniques produce to infer tactics and sufficiency for matching and scoring, which transforms and comparisons are efficacious, when is there sufficient insight, what are the appropriate rankings/scores, etc. In additional or alternative aspects, the rules engine can be characterized by interoperability considerations, low impedance access to facts and inferences in a match bundle, interoperable with invocations of relationship detection techniques on specific facets, maintaining rule match state within an appropriate thread contexts for candidate and query, configuration considerations, agnostic intuitive paradigm that is configurable to multiple domains, domain factual knowledge, facilities to refine and extend rules, tune to improve performance and quality, reflect lessons from data corpus (e.g., association or disassociation, expanding knowledge base, etc.), produces the same overall results through equivalent queries independently of the sequence of candidates or independently of the inference sequence for a single candidate, low cost resets for query and candidate shifts, and facilities to explain reasons for actions and inferences.

The score card extension can be a reusable extension to satisfy multiple match domains. The score card extension may be a set of tables, a DSL, Common Programming language, or some combination of all three. The score card can present a score with each candidate along with reason codes (negative or positive). Any record from the candidate set that has a defined and acceptable score can be returned to the calling application for application level analysis if necessary.

Implementation Flow Perspective

In some aspects, the global matching system 110 includes a bundle builder. The bundle builder can receive input data in an external format and transform the input data into a normalized meta-controlled bundle format that the framework understands (e.g., by transforming raw data in the query and the raw data in a list of potential match candidates). The results of the transform, as well as the original bundle values, are available to future service calls.

The bundle meta-definition process can use the transformed data. Data can be marshalled in and out of services (transforms, contrastors, script engine, score engine) using meta-constructs that can be exposed to a script engine. A defined interface for the framework can be coded into the plugins used by the global matching system 110. For example, if a parse transform is defined, a metadata field is defined for the "parse in" function and a metadata field is defined for the "parse out" function in the script configuration.

In an example, a string comparator is first used with a full query to a candidate record, and if the string comparator indicates equality, a weighted value can be added to a score accumulator. The global matching system 110 may then go directly to a score service. If the string comparator indicates inequality, the global matching system 110 may parse the query and candidate record into sub-tokens, after which the global matching system 110 can run a Bayesian routine on the token collections and adjust the core factor. A basic understanding of contrastor, transform, and score factor logic can be built into a script definition used by the global matching system 110. This process can be domain-specific. After processing candidate records 0-n, the original candidate records can be returned with a score and potential reason code to the calling application for a final decision.

IMPLEMENTATION EXAMPLE

In some aspects, the global matching system 110 can include a rules engine that interacts with bundled, meta-controlled data. The rules flow can interact with support libraries and meta-bundles through an abstract class structure. The rules engine can define the flow of the global matching system 110. The rules engine can be implemented as an object flow.

For example, the global match system can perform a matching operation for a business name. The matching operation may use commercial data mixed with production system inquiries, which have candidate records obtained from a SOLR search implementation based on company name. A bundle builder can convert the query and candidate set results from the SOLR comma delimited result set to the internal format used by the executive engine.

A series of transform plugins can parse, clean and tokenize the business names and addresses. Transforms can also clean up special characters. Word substitution can be used for business and address word variations.

A basic library of transform and contrastor algorithms can be used to support an operation for matching a business name. Examples of these algorithms can include: (1) String compare; (2) klevenshtein—delete, insert, substitute (note transposition=2 substitutes; (3) klevenshteinBound—stop when distance exceed bound; (4) koptimalEdistance—this also allows transposition; (5) klargestCommonSubstring; (6) kisSubString—strips leading 0's; (7) knoSpaceDistance—removes space and punctuation; (8) kFuzzyLevenshtein—levenshtein with adjustments for leading 0's and common substrings; (9) ksameFirstWord—true if same to 1st blank, pNullOk return true if either is empty; (10) ksameSameOrBlank—0 same, 1 xa blank, 2 xb blank, else; (11) Token Set Compare; (12) kJaroWink—Jaro Winkler similarity measure; (13) sad—sets flags according to relative sizes of common and unique counts, e.g., Unique A=0=>subphrase; (14) Parsers; (15) Address—Crude Position based Zip, State, Town, Street; (16) Tokenizers; (17) Soundex Variation—Soundex Like hash up to 8 characters; (18) Cleansers; and (19) String Cleansing—Special character and word substitution for Street Address and Business Names.

For each result of a contrastor, a weighted value can be defined in a script engine. The weighted values can be added or subtracted throughout the flow, and the final accumulated value can represent the final score. An example of a set of implementation rules is provided in the table depicted in FIG. 20. In some aspects, the global matching system 110 can use one or more of the tools included in the table depicted in FIG. 21.

General Considerations

Unless specifically stated otherwise, throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The global matching system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the operations presented in the examples above can be varied—for example, operations can be re-ordered, combined, or broken into sub-blocks. Certain operations or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, alterations to, variations of, and equivalents to such aspects may be readily produced from this description. Each of the disclosed aspects, examples, or features may be combined with one or more of the other aspects, examples, or features. Accordingly, the present disclosure has been presented for purposes of example rather than limitation, and does not preclude inclusion of such modifications, variations, or additions to the present subject matter as would be readily apparent to one of ordinary skill in the art.

What is claimed is:

1. A global matching system comprising:
a match server including a communications network port for communicatively coupling to a telecommunications network and receiving input data from one or more client devices via the telecommunications network;
a processing device communicatively coupled to the match server; and
a memory device on which software modules including instructions are stored that are executable by the processing device or the match server, the software modules including:
an application module configured to:
receive the input data from the match server to be matched to target data stored in data sources communicatively coupled to the match server, the data sources comprising non-transitory computer-readable media for storing the target data comprising identifiers of entities and data describing transactions in which the entities have engaged;
extract at least one context parameter for the input data by transforming the input data into tokens and matching the tokens to a person classification or business classification, the at least one context parameter being indicative of a location-specific characteristic or culturally specific characteristic of an entity associated with the input data;
cause the processing device to transmit, to the matching server, a request for matching tools comprising respective program code portions for matching different types of input data to the target data;
cause the processing device to receive, from the matching server a set of the matching tools based on the request, wherein each matching tool in the set of matching tools is configured to determine similarities or differences between data input to the matching tool and the target data;
select a subset of the matching tools from the set of matching tools based on the context parameter;
generate combined program code from the selected subset of the matching tools that implements an order of execution for a subset of program code portions in the subset of the matching tools based on the context parameter;
identify at least one transformation operation for transforming the input data into a format suitable for use by the subset of the matching tools; and
apply the at least one transformation operation to generate transformed input data in the format; and
a query module configured to:
cause the match server to iteratively execute the combined program code implementing operations of the subset of the matching tools in the order of execution by at least providing the transformed input data to at least one matching tool in the subset of the matching tools to retrieve a matching result from the data sources; and
cause the match server to output, from the executed subset of the matching tools, the matching result for the input data and the target data.

2. The global matching system of claim 1, wherein the query module is further configured to cease execution of the subset of the matching tools based on applying at least one context specific rule to the output.

3. The global matching system of claim 1, wherein the instructions included in the application module for extracting the at least one context parameter further comprises an instruction for causing the processing device to extract the context parameter based on determining the entity is a person and the input data is personal data or based on determining the entity is a business and the input data is commercial data.

4. The global matching system of claim 1, wherein the instructions included in the application module for causing the processing device to select the subset of the matching tools further comprises an instruction for causing the processing device to select a semantic matching tool, a least-worst matching tool, and a systematic matching tool.

5. The global matching system of claim 1, wherein the instructions included in the query module for causing the match server to execute the combined program code comprises an instruction for causing the processing device to:
  execute a tight matching tool of the subset of the matching tools, wherein the tight matching tool identifies a first set of candidate matching results that match a first threshold amount of data from the data sources; and
  execute a loose matching tool of the subset of the matching tools using results of the tight matching tool, wherein the loose matching tool identifies a second set of candidate matching results that match a second threshold amount of data from the data sources, wherein the second threshold amount of data is lower than the first threshold amount of data.

6. A non-transitory computer-readable medium in which software modules including instructions executable by a processing device or a match server are stored, the software modules including:
  an application module configured to:
    receive first input data and second input data to be matched to target data stored in data sources communicatively coupled to the match server, the match server including a communications network port for communicatively coupling to a telecommunications network and receiving input data from one or more client devices via the telecommunications network, the data sources comprising non-transitory computer readable media for storing the target data comprising identifiers of entities and data describing transactions in which the entities have engaged;
    extract a first context parameter from the first input data and a second context parameter from the second input data, wherein extracting each context parameter comprises transforming respective input data into respective tokens and matching the respective tokens to a respective person classification or business classification, wherein each context parameter is indicative of a respective location-specific characteristic or culturally specific characteristic of respective entity associated with the respective input data;
    identify a first order of execution from the extracted first context parameter and a second order of execution from the extracted second context parameter, wherein the first order of execution indicates a different sequencing of program code portions as compared to the second order of execution; and
    generate (a) first combined program code from a subset of matching tools and (b) second combined program code from the subset of the matching tools wherein the first combined program code implements the first order of execution for a subset of program code portions in the subset of the matching tools and the second combined program code implements the second order of execution for the subset of program code portions in the subset of the matching tools, wherein each matching tool in the subset of the matching tools is configured to determine similarities or differences between data input to the matching tool and the target data;
    identify at least one transformation operation for transforming the first input data and the second input data into a format suitable for use by the subset of the matching tools; and
    apply the at least one transformation operation to generate transformed first input data and transformed second input data in the format; and
  a query module configured to:
    cause the match server to retrieve a first matching result from the data sources by, at least iteratively executing the first combined program code bar providing the transformed first input data to at least one matching tool in the subset of the matching tools and to retrieve a second matching result from the data sources by, at least, iteratively executing the second combined program code by providing the transformed second input data to at least one matching tool in the subset of the matching tools; and
    cause the match server to output the first matching result and the second matching result for the first input data, the second input data, and the target data.

7. The non-transitory computer-readable medium of claim 6, wherein the application module is further configured to:
  cause the processing device to transmit, to the matching server, a request for matching tools comprising respective program code portions for matching different types of input data to the target data;
  cause the processing device to receive, from the matching server including a set of the matching tools based on the request; and
  select the subset of the matching tools based on the context parameter.

8. The non-transitory computer-readable medium of claim 7, wherein the instructions included in the application module further comprise an instruction for causing the processing device to select, as at least part of the selected subset of the matching tools, a semantic matching tool, a least-worst matching tool, and a systematic matching tool.

9. The non-transitory computer-readable medium of claim 6, wherein the query module is further configured to cease execution of the first combined program code and the second combined program code based on applying at least one context-specific rule to the output.

10. The non-transitory computer-readable medium of claim 6, wherein the instructions included in the query module for causing the match server to execute at least one of the first combined program code or the second combined program code comprises an instruction for causing the processing device to:
  execute a tight matching tool of the subset of the matching tools; and
  execute a loose matching tool of the subset of the matching tools using results from the tight matching tool.

11. The non-transitory computer-readable medium of claim 6, wherein the instructions included in the application module for causing the processing device to extract each context parameter further comprises an instruction for causing the processing device to extract the context parameter based on at least one of (a) determining the respective entity is a respective person and the respective input data is respective personal data or (b) determining the respective entity is a respective business and the input data is respective commercial data.

12. A method comprising:

receiving input data from a match server to be matched to target data stored in data sources communicatively coupled to the match server, the match server including a communications network port for communicatively coupling to a telecommunications network and receiving the input data from one or more client devices via the telecommunications network, the data sources comprising non-transitory computer-readable media for storing target data comprising identifiers of entities and data describing transactions in which the entities have engaged;

extracting at least one context parameter for the input data by transforming the input data into tokens and matching the tokens to a person classification or business classification, the at least one context parameter being indicative of a location-specific characteristic or culturally specific characteristic of an entity associated with the input data;

transmitting, by a processing device communicatively coupled to the match server, a request for matching tools;

receiving, by the processing device, a set of the matching tools based on the request, the matching tools comprising different program code portions that, when executed, perform executable functions that match different types of input data to target data, wherein each matching tool in the set of matching tools is configured to determine similarities or differences between data input to the matching tool and the target data;

selecting, from the received set of the matching tools, a subset of the matching tools based on the context parameter extracted from the input data;

identifying an order of execution based on the context parameter;

identifying at least one transformation operation for transforming the input data into a format suitable for use by the subset of the matching tools;

applying the at least one transformation operation to generate transformed input data in the format;

retrieving, by the match server, a matching result from the data sources by, at least iteratively executing combined program code that is generated by combining, according to the identified order of execution, a subset of the program code portions that implement operations of the subset of the matching tools, wherein executing the combined program code comprises providing the transformed input data to at least one matching tool in the subset of the matching tools; and outputting, by the match server, from the executed subset of the matching tools, the matching result for the input data and the target data.

13. The method of claim 12, further comprising:

ceasing execution of the subset of the matching tools based on applying at least one context-specific rule to the output.

14. The method of claim 12, wherein executing the combined program code comprises:

executing a tight matching tool of the subset of the matching tools; and executing a loose matching tool of the subset of the matching tools using results of the tight matching tool.

15. The method of claim 12, wherein extracting the at least one context parameter further comprises extracting the context parameter based on determining the entity is a person and the input data is personal data or based on determining the entity is a business and the input data is commercial data.

16. The method of claim 12, wherein selecting the subset of the matching tools further comprises selecting a semantic matching tool, a least-worst matching tool and a systematic matching tool.

* * * * *